United States Patent
Mori

(10) Patent No.: US 8,298,079 B2
(45) Date of Patent: Oct. 30, 2012

(54) NETWORK GAME SYSTEM, SERVER, UNAUTHORIZED BEHAVIOR PREVENTION METHOD, UNAUTHORIZED BEHAVIOR DETECTION METHOD, INFORMATION RECORDING MEDIUM, AND PROGRAM

(75) Inventor: Shoji Mori, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 279 days.

(21) Appl. No.: 12/680,784

(22) PCT Filed: Oct. 2, 2008

(86) PCT No.: PCT/JP2008/067968
§ 371 (c)(1),
(2), (4) Date: Mar. 30, 2010

(87) PCT Pub. No.: WO2009/044832
PCT Pub. Date: Apr. 9, 2009

(65) Prior Publication Data
US 2010/0222142 A1    Sep. 2, 2010

(30) Foreign Application Priority Data
Oct. 4, 2007 (JP) ................... 2007-260688

(51) Int. Cl.
*A63F 13/10* (2006.01)
(52) U.S. Cl. ................ 463/30; 463/42; 463/29
(58) Field of Classification Search ........ 463/29, 463/30, 36, 40, 42, 31–34
See application file for complete search history.

(56) References Cited

U.S. PATENT DOCUMENTS 7,713,126 B2 *    5/2010   Suzuki et al. ................ 463/31
2007/0192849 A1   8/2007   Golle et al.

FOREIGN PATENT DOCUMENTS

| CN | 1694401 A | 11/2005 |
| JP | 2001-145781 | 5/2001 |
| JP | 2003-038855 | 2/2003 |
| JP | 2004-024607 | 1/2004 |

(Continued)

OTHER PUBLICATIONS

Trend Micro Inc., "CAPTCHA Wish Your Girlfriend Was Hot Like Me?", TrendLabs, Malware Blog by Trend Micro, Retrieved from <:http://blog.trendmicro.com/captcha-wish-your-girlfriend-was-hot-like-me/>, on Oct. 27, 2008, 7 pages.

(Continued)

*Primary Examiner* — Peter DungBa Vo
*Assistant Examiner* — Damon Pierce
(74) *Attorney, Agent, or Firm* — Howard & Howard Attorneys PLLC

(57) ABSTRACT

A terminal management unit (202) manages characters or the like in a virtual space operated from a terminal. An event generation unit (203) causes game device to generate a verification event for verifying a player's manual operation based on the progress state of a game on the game device. A judgment unit (204) judges whether the manual operation is performed or not based on operation information on the terminal during the verification event. A game situation update unit (205) properly updates a game situation on the terminal based on the judgment result from the judgment unit (204).

7 Claims, 15 Drawing Sheets

FOREIGN PATENT DOCUMENTS

| | | |
|---|---|---|
| JP | 2004-223084 | 8/2004 |
| JP | 2006-081609 | 3/2006 |
| JP | 2006-223496 | 8/2006 |
| TW | I245660 B | 12/2005 |
| TW | 200600170 A | 1/2006 |

OTHER PUBLICATIONS

Taiwanese Office Action with English Translation (Issued Nov. 18, 2011).

* cited by examiner

| PLAYER ID | CHARACTER ID | CURRENT POSITION | DIRECTION | LEVEL | CARRYING MONEY | CARRYING ITEM | EMPIRICAL VALUE | HP | MP | ... |
|---|---|---|---|---|---|---|---|---|---|---|
| P-123 | C-234 | (x1, y1, z1) | (x2, y2, z2) | 3 | 2093 | LIGHT ○○ | 1012 | 121 | 30 | ... |
| P-124 | C-578 | (x3, y3, z3) | (-x4, y4, z4) | 5 | 5320 | FLAME △△ | 2643 | 248 | 92 | ... |
| P-125 | C-499 | (x5, y5, z5) | (x6, -y6, z6) | 2 | 629 | — | 775 | 95 | 14 | ... |
| P-126 | C-611 | (x7, y7, z7) | (x8, -y8, z8) | 4 | 3001 | SPIRITUAL ×× | 1839 | 180 | 59 | ... |
| ... | ... | ... | ... | ... | ... | ... | ... | ... | ... | ... |

Fig. 4A

| OPPONENT CHARACTER ID | CURRENT POSITION | DIRECTION | HP | MP | OBTAINED MONEY | OBTAINED ITEM | OBTAINED EMPIRICAL VALUE | ... |
|---|---|---|---|---|---|---|---|---|
| M-003 | (x1, y2, z3) | (x2, -y3, z4) | 121 | - | 12 | - | 6 | ... |
| M-467 | (x4, y5, z6) | (-x5, y6, z7) | 248 | 28 | 24 | WINDY ◇◇ | 12 | ... |
| M-142 | (x7, y8, z9) | (x9, -y9, z9) | 95 | - | 9 | - | 4 | ... |
| ... | ... | ... | ... | ... | ... | ... | ... | |

Fig. 4B

NETWORK GAME SYSTEM, SERVER, UNAUTHORIZED BEHAVIOR PREVENTION METHOD, UNAUTHORIZED BEHAVIOR DETECTION METHOD, INFORMATION RECORDING MEDIUM, AND PROGRAM

TECHNICAL FIELD

The present invention relates to a network game system, a server, an unauthorized behavior prevention method, an unauthorized behavior detection method, an information recording medium, and a program, which can adequately prevent an unauthorized behavior such as a Bot.

BACKGROUND ART

There are various network games (online games) which are popular. In an MMORPG (Massively Multiplayer Online Role Playing Game), for example, several hundred to several thousand players (game terminals or the like) can participate simultaneously, and can individually enjoy an adventure or the like in a vast virtual space.

In this MMORPG, a player can manipulate his/her own character (local character) to defeat an opponent or solve a mystery in order to train the local character while obtaining money (currency in the game) or an item. A big feature of an MMORPG is that a player can meet another player (character) and enter an adventure together or enjoy conversations with each other.

In such a technical field, an art of a network game system that easily refers to and displays a play situation on another game terminal to direct a network based play is disclosed (see, for example, Patent Document 1).
Patent Document 1: Unexamined Japanese Patent Application KOKAI Publication No. 2004-223084 (pp. 5-12, FIG. 1)

DISCLOSURE OF INVENTION

Problems to be Solved by the Invention

A drawback of the aforementioned network game is that unauthorized behaviors can be performed by some illegitimate players. In MMORPGs, for example, unauthorized behaviors called Bot, which uses a program or the like to automatically perform the operation of a game terminal that should be manually performed by a player, are spreading.

This Bot can automatically permit an execution of an operation that allows a local character to circulate throughout predetermined areas to battle with opponents encountered one after another thereby saving money and items obtained by defeating the opponents.

This may result in a significant difference in the level (strength or the like) of a local character, or something owned (money, items or the like) between an illegitimate player who carries out a Bot and a bona fide player who plays normally. As a result, bona fide players have heightened feelings of unfairness and, therefore, do not fully enjoy playing games.

Some illegitimate players execute a real money trade to resell obtained money or items with real money to obtain profits, which is becoming a bigger problem.

Therefore, it is desirable to have a scheme capable of preventing unauthorized behavior like, for example, a Bot in a network game.

The present invention has been made to overcome the foregoing problems, and it is an object of the invention to provide a network game system, a server, an unauthorized behavior prevention method, an unauthorized behavior detection method, an information recording medium, and a program, which can adequately prevent unauthorized behavior such as a Bot.

Means for Solving the Problems

A network game system according to a first aspect of the invention has a server and a game device connected together in a communicatable manner to allow a player to play a game on the game device, wherein the server includes an event generation unit and an update unit, and the game device includes a management unit and an operation information transmission unit.

First, the event generation unit in the server causes the game device to generate a verification event for verifying a manual operation of the player based on a progress state of the game on the game device. For example, a verification image (image or the like including a content viewable by a player) generated by the server is displayed on the game device based on the progress state, such as at the time of defeating an opponent, at the time of clearing a stage or the like, at the time of updating a highest score or the like, and at the time of demanding necessary characters (password or the like), prompting the player to perform an operation according to the verification image.

Then, the update unit updates a game situation on the game device according to operation information indicating that operation content transmitted from the game device which has generated the verification event. For example, when proper operation information (operation to be performed by the player who has seen the verification image) according to the verification image is acquired, the update unit judges whether the player is manually operating the game, and the game situation is made advantageous for the player. For example, the money, the empirical value or the like of a character (player character or the like) is increased, or a predetermined item or the like is given. In addition, a character may be allowed to make a predetermined action in a game. By way of example, a door may be opened to permit further advancement, a map or a field in a game may be expanded to widen the range of action, or predetermined information may be viewed/transmitted by acceptance of log-in or the like.

On the other hand, when proper operation information according to the verification image is not acquired the update unit determines whether the operation is (likely to be) a Bot-originated automatic operation, and, if the operation is a Bot-originated automatic operation, the game situation is not updated putting the Bot at a disadvantage; Instead, the game is updated to put the Bot in an even more disadvantageous position. At the time of defeating an opponent, for example, money, an empirical value or the like may not be obtained, the money, the empirical value or the like of a character may be decreased, or a predetermined item or the like may be removed. In addition, the action in a game may be restricted. By way of example, a door may be closed to inhibit further advancement (retracing), a map or a field in a game may be reduced to narrow the range of action, or log-out may be carried out so that information will not be acquired.

Next, the management unit in the game device manages a game situation including the progress state of the game. For example, information, such as the level, HP (Hit Point), MP (Magic Point), empirical value, carrying money, and carrying items of a character, and information, such as the current position or a movable range on a map or a field, the number of defeated boss characters, and the number of cleared stages are managed.

Then, the operation information transmission unit transmits the operation information indicating the operation content to the server, when the verification event is generated by the server. For example, verification image generated by the server may be displayed, and the operation information acquired with the verification image displayed may be transmitted to the server.

That is, when the game device becomes a predetermined progress state, the server generates a verification event, and attempts to verify from the acquired operation information if the operation is a manual operation performed by the player. Only when the manual operation performed on the game device by the player is verified, an advantageous game situation is updated for the player. When the manual operation of the player is not verified, on the other hand, it does not become advantageous (rather it may become disadvantageous). In other words, from the reaction to the verification image, it is possible to determine whether a character is manipulated by the player, or whether it is a Bot-originated operation. Unlike in the related art, this makes it possible to inhibit money carrying, item carrying or the like from being increased even by execution of an unauthorized behavior, such as a Bot.

Consequently, an unauthorized behavior like a Bot can be prevented properly.

The server may further include a manual operation judgment unit that judges whether a manual operation is performed on the game device based on the operation information transmitted from the game device, and the update unit of the server may update the game situation based on a judgment result from the manual operation judgment unit.

For example, when operation information transmitted from the game device according to the verification image which is displayed in a verification event is a proper operation to be performed by the player viewing the verification image, the manual operation judgment unit judges that the player is manually operating. However when the operation is improper, on the other hand, the manual operation judgment unit judges that the operation is (likely to be) a Bot-originated automatic operation.

When it is judged that the player is manually operating, the update unit updates the game situation in such a way as to be advantageous for the player. When it is judged that the operation is a Bot-originated automatic operation, on the other hand, the update unit does not update the game situation so as not to give any advantage; rather it is updated in such a way as to be disadvantageous.

In this case, it is possible to properly judge the presence/absence of the manual operation of the player and reflect the judgment on the update of the game situation.

Every time operation information is transmitted, the manual operation judgment unit may sequentially make a judgment based on the operation information, and judge that a manual operation is performed only when proper operation information is transmitted within a predetermined time.

In this case, even if the player performs an erroneous operation, but then the player performs a proper operation (which should be performed) within a predetermined time, it is possible to properly determine whether that operation was manual. It should be noted that when a proper operation is not performed within the predetermined time, the operation is deemed not (likely to be) a manual operation.

Every time operation information is transmitted, the manual operation judgment unit may sequentially make a judgment based on the operation information, and judge that a manual operation is performed only when proper operation information is transmitted within a predetermined number of times.

In this case, even if the player performs an erroneous operation, but then performs a proper operation (which should be performed) within a predetermined number of times, it is possible to properly determine whether the operation is a manual operation. It should be noted that when a proper operation is not performed within the predetermined number of times, the operation is deemed not (likely to be) a manual operation.

A network game system according to a second aspect of the invention has a server and a game device connected together in a communicatable manner to allow a player to manipulate a character in a virtual space on the game device, wherein the server includes a verification image transmission unit and an update unit, and the game device includes a management unit, an image display unit and an operation information transmission unit.

First, the verification image transmission unit in the server transmits a verification image for verifying a character manipulation by the player to the game device based on a progress state of the game on the game device. For example, a verification image (image or the like including a content viewable by a player) generated by the server may be transmitted to the game device based on the progress state, such as at the time of defeating an opponent, at the time of clearing a stage or the like, and at the time of demanding necessary characters.

Then, the update unit updates a game situation on the game device based on operation information indicating a content of the character manipulation in the game device which has transmitted the verification image. For example, when proper operation information according to the verification image is acquired, it is judged whether the player is manually operating, and the game situation is updated in such a way as to be advantageous for the player. (As an example, the money, the empirical value or the like of a character is increased, or a predetermined item or the like is given. In addition, a character is allowed to make a predetermined action in a game.)

On the other hand, when proper operation information according to the verification image is not acquired, it is judged that the operation is (likely to be) a Bot-originated automatic operation, and the game situation is not updated so as not to give any advantage; rather it is updated in such a way as to be disadvantageous. (As an example, at the time of defeating an opponent, money, an empirical value or the like is not be obtained, the money, the empirical value or the like of a character is decreased, or a predetermined item or the like, is removed. In addition, the action in a game is restricted.)

Next, the management unit in the game device manages a game situation including the progress state of the game. For example, information, such as the level and items carried by the character, and information, such as the current position or a movable range on a map or a field, are managed. The image display unit displays the verification image when the verification image is transmitted from the server. Then, the operation information transmission unit transmits the operation information indicating that the content of a character's manipulation is in a state where the verification image is displayed.

That is, when the game device becomes a predetermined progress state, the server causes the game device to display a verification image, and attempts to verify from the acquired operation information if the operation is a manual operation performed by the player (manual character manipulation).

Only when the manual operation performed on the game device by the player is verified, the game situation is updated in such a way as to be advantageous for the player. When the manual operation of the player is not verified, on the other hand, it does not become advantageous (rather it may become disadvantageous). In other words, from the reaction to the verification image, it is possible to determine whether a character is being manipulated by a player, or if it is being manipulated by Bot-originated operations. Unlike in the related art, this makes it possible to inhibit money carrying, item carrying or the like from being increased even by execution of an unauthorized behavior, such as a Bot.

Consequently, an unauthorized behavior like a Bot can be prevented properly.

The server may further include a properness/improperness judgment unit that judges properness/improperness of a character movement with respect to the verification image based on the operation information transmitted from the game device, and the update unit of the server may update the game situation in such a way as to be advantageous for the character when the properness/improperness judgment unit has judged that the character movement is proper.

In this case, only when it is judged that the character movement on the game device is proper and the manual operation of the player is verified, the game situation is updated in such a way as to be advantageous for the player. That is, even if an unauthorized behavior, such as a Bot, is taken, the proper character movement is not carried out, so that, unlike in the related art, money carrying, item carrying or the like cannot be increased at all.

The server may also include a verification image generation unit that generates a verification image in which a specific image is located at an arbitrary position when a predetermined condition is fulfilled in the game of the game device, the verification image transmission unit of the server may transmit, to the game device, a verification image which is generated by the verification image generation unit every time a location of the specific image is improper, and the properness/improperness judgment unit of the server may judge properness/improperness of a character movement with respect to the specific image located in the verification image to judge whether the specific image is viewed by the player.

In this case, a verification image differs every time, so that only when viewed by the player, a proper character movement can be carried out. That is, even if unauthorized behavior, such as Bot behavior, is taken, the proper character movement is not carried out, so that, unlike in the related art, money carrying, item carrying or the like cannot be increased at all.

The image display unit of the game device may display a game image during a game, and change the scenery of the game image, and display the verification image when the verification image is transmitted from the server.

In this case, even if there is an attempt to extract a verification image (specific image or the like) from game images before and after the display of the verification image by making good use of image processing at the time of making unauthorized behavior, such as Bot behavior, the scenery of the game image itself is changed, so that the verification image cannot be extracted.

A server according to a third aspect of the invention is connected in a communicatable manner to a game device which allows a player to play a game, and is configured to include an event generation unit and an update unit.

First, the event generation unit causes the game device to generate a verification event for verifying a manual operation of the player based on a progress state of the game on the game device. For example, a verification image (image or the like including a content viewable by a player) generated by the server is displayed on the game device based on the progress state, at a predetermined time, such as, for example, at the time of defeating an opponent, at the time of clearing a stage or the like, and at the time of demanding necessary characters prompting the player to perform an operation according to the verification image.

Then, the update unit updates a game situation on the game device according to operation information indicating an operation content transmitted from the game device which has generated the verification event. For example, when a proper operation information according to the verification image is acquired, the player is deemed to be manually operating, and an advantageous game situation is updated for the player. (for example, the money, the empirical value or the like of a character is increased, or a predetermined item or the like is given. In addition, a character may also be allowed to make a predetermined action in a game.)

On the other hand, when proper operation information according to the verification image is not acquired, the operation is deemed to be (likely to be) a Bot-originated automatic operation, and an advantageous game situation is not updated; instead, a disadvantageous game situation is updated. (By way of example, at the time of defeating an opponent, money an empirical value or the like may be blocked, the money, the empirical value or the like of a character may be decreased, or a predetermined item or the like may be removed. In addition, the action in a game may be restricted.)

That is, when the game device arrives at a predetermined progress state, the server generates a verification event, and attempts to verify from the acquired operation information if the operation is a manual operation performed by the player. Only when the manual operation performed on the game device by the player is verified, the game situation is updated in such a way as to be advantageous for the player. When the manual operation of the player is not verified, on the other hand, it does not become advantageous (rather it may become disadvantageous). In other words, from the reaction to the verification image, it is possible to determine whether a character is manipulated by the player, or if it is a Bot-originated operation. Unlike in the related art, this makes it possible to inhibit money carrying, item carrying or the like from being increased even by execution of an unauthorized behavior, such as a Bot.

Consequently, an unauthorized behavior like a Bot can be prevented properly.

A server according to a fourth aspect of the invention is connected in a communicatable manner to a game device which allows a player to manipulate a character in a virtual space, and is configured to include a verification image transmission unit and an update unit.

First, the verification image transmission unit transmits a verification image for verifying a character manipulation by the player to the game device based on a progress state of the game on the game device. For example, a verification image (image or the like including a content viewable by a player) generated by the server is transmitted to the game device based on the progress state, such as at the time of defeating an opponent, at the time of clearing a stage or the like, and at the time of demanding necessary characters.

Then, the update unit updates a game situation on the game device based on operation information indicating a content of the character manipulation in the game device which has transmitted the verification image. For example, when proper operation information according to the verification image is acquired, it is judged that the player is manually operating the game, and the game situation is updated in such a way as to be advantageous for the player. (As an example, the money, the empirical value or the like of a character is increased, or a predetermined item or the like is given. In addition, a character is allowed to make a predetermined action in a game.)

On the other hand, when proper operation information according to the verification image is not acquired, the operation is deemed (likely to be) a Bot-originated automatic operation, and an advantageous game situation is not updated; instead, it is updated in such a way as to be disadvantageous. (As an example, at the time of defeating an opponent, money an empirical value or the like is blocked, the money, the empirical value or the like of a character is decreased, or a predetermined item or the like is removed. In addition, the action in a game is restricted.)

That is, when the game device arrives at a predetermined progress state, the server causes the game device to display a verification image, and attempts to verify from the acquired operation information if the operation is a manual operation performed by the player (manual character manipulation). Only when the manual operation performed on the game device by the player is verified, the game situation is updated in such a way as to be advantageous for the player. When the manual operation of the player is not verified, on the other hand, it does not become advantageous (rather it may become disadvantageous). In other words, from the reaction to the verification image, it is possible to determine whether a character is manipulated by the player, or if it is a Bot-originated operation. Unlike in the related art, this makes it possible to inhibit money carrying, item carrying or the like from being increased even by execution of an unauthorized behavior, such as a Bot.

Consequently, an unauthorized behavior like a Bot can be prevented properly.

The server may further include a properness/improperness judgment unit that judges properness/improperness of a character movement with respect to the verification image based on the operation information transmitted from the game device, and the update unit may update the game situation in such a way as to be advantageous for the character when the properness/improperness judgment unit deems that the character movement is proper.

In this case, only when it is judged that the character movement on the game device is proper and the manual operation of the player is verified, the game situation is updated in such a way as to be advantageous for the player. That is, even if an unauthorized behavior, such as a Bot, is taken, the proper character movement is not carried out, so that, unlike in the related art, money carrying, item carrying or the like cannot be increased at all.

The server may further include a verification image generation unit that generates a verification image in which a specific image is located at an arbitrary position when a predetermined condition is fulfilled in the game of the game device, the verification image transmission unit may transmit, to the game device, a verification image which is generated by the verification image generation unit every time a location of the specific image is improper, and the properness/improperness judgment unit may judge properness/improperness of a character movement with respect to the specific image located in the verification image to judge whether the specific image is viewed by the player.

In this case, a verification image differs every time, so that only when viewed by the player, a proper character movement is carried out. That is, even if an unauthorized behavior, such as Bot behavior, is taken, the proper character movement is not carried out, so that, unlike in the related art, money carrying, item carrying or the like cannot be increased at all.

A unauthorized behavior prevention method according to a fifth aspect of the invention is for a network game system which has a server and a game device connected together in a communicatable manner, wherein the game device includes a management unit that manages a game situation including the progress state of the game, and the method is configured to include an event generation step, an operation information transmission step and an update step.

First, in the server, the event generation step causes the game device to generate a verification event for verifying a manual operation of the player based on a progress state of the game on the game device. For example, a verification image (image or the like including a content viewable by a player) generated by the server is displayed on the game device based on the progress state, such as at the time of defeating an opponent, at the time of clearing a stage or the like, and at the time of demanding necessary characters.

Next, in the game device, in the operation information transmission step, when the verification event is generated by the server, the operation information indicating the operation content is transmitted to the server.

Further, in the server, in the update step, a game situation on the game device is updated based on operation information transmitted from the game device which has generated the verification event. For example, when proper operation information according to the verification image is acquired, the player is deemed to be manually operating, and the game situation is updated in such a way as to be advantageous for the player. (As an example, the money, the empirical value or the like of a character is increased, or a predetermined item or the like is given. In addition, a character may be allowed to make a predetermined action in a game.)

On the other hand, when proper operation information according to the verification image is not acquired, the operation is deemed (likely to be) a Bot-originated automatic operation, and the game situation is not updated so as not to give any advantage; instead, it is updated in such a way as to be disadvantageous. (For example, at the time of defeating an opponent, money, an empirical value or the like is blocked, the money, the empirical value or the like of a character is decreased, or a predetermined item or the like is removed. In addition, the action in a game is restricted.)

That is, when the game device arrives at a predetermined progress state, the server generates a verification event, and attempts to verify from the acquired operation information if the operation is a manual operation performed by the player. Only when the manual operation performed on the game device by the player is verified, is the game situation updated in such a way as to be advantageous for the player. When the manual operation of the player is not verified, on the other hand, it does not become advantageous (rather it may become disadvantageous). In other words, from the reaction to the verification image, it is possible to determine whether a character is manipulated by the player, or if it is a Bot-originated operation. Unlike in the related art, this makes it possible to inhibit money carrying, item carrying or the like from being increased even by execution of an unauthorized behavior, such as a Bot.

Consequently, an unauthorized behavior like a Bot can be prevented properly.

A unauthorized behavior detection method according to a sixth aspect of the invention is for a server connected in a communicatable manner to a game device which allows a player to manipulate a character in a virtual, and is configured to include a verification image transmission step and an update step.

First, in the verification image transmission step, a verification image for verifying a character manipulation by the player is transmitted to the game device based on a progress state of the game on the game device. For example, a verification image (image or the like including a content viewable by a player) generated by the server is transmitted to the game device based on the progress state, such as at the time of defeating an opponent, at the time of clearing a stage or the like, and at the time of demanding necessary characters.

Then, in the update step, a game situation on the game device is updated based on operation information indicating a content of the character manipulation in the game device which has transmitted the verification image. For example, when proper operation information according to the verification image is acquired, it is judged that the player is manually operating, and the game situation is updated in such a way as to be advantageous for the player. (As an example, the money, the empirical value or the like of a character is increased, or a predetermined item or the like is given. In addition, a character is allowed to make a predetermined action in a game.)

On the other hand, when proper operation information according to the verification image is not acquired, the operation is deemed (likely to be) a Bot-originated automatic operation, and the game situation is not updated so as not to give any advantage; rather it is updated in such a way as to be disadvantageous. (As an example, at the time of defeating an opponent, money, an empirical value or the like is not be obtained, the money, the empirical value or the like of a character is decreased, or a predetermined item or the like is removed. In addition, the action in a game is restricted.)

That is, when the game device is in a predetermined progress state, the game device is caused to display a verification image, and attempts to verify from the acquired operation information if the operation is a manual operation performed by the player (manual character manipulation). Only when the manual operation performed on the game device by the player is verified, the game situation is updated in such a way as to be advantageous for the player. When the manual operation of the player is not verified, on the other hand, it does not become advantageous (rather it may become disadvantageous). In other words, from the reaction to the verification image, it is possible to determine whether a character is manipulated by the player, or if it is a Bot-originated operation. Unlike in the related art, this makes it possible to inhibit money carrying, item carrying or the like from being increased even by execution of an unauthorized behavior, such as a Bot.

Consequently, unauthorized behavior like Bot behavior can be prevented properly.

An information recording medium according to a seventh aspect of the invention stores a program for allowing a computer (including an electronic device) to function as the above-described server.

A program according to an eighth aspect of the invention is structured to allow a computer (including an electronic device) to function as the above-described server.

This program can be recorded in a computer readable information recording medium, such as a compact disk, a flexible disk, hard disk, a magneto-optical disk, a digital video disk, a magnetic tape or a semiconductor memory.

The program can be distributed and sold over a computer communication network, independently of a computer which executes the program. The information recording medium can be distributed and sold independently of the computer.

Advantage of the Invention

The invention can adequately prevent an unauthorized behavior such as a Bot.

BRIEF DESCRIPTION OF DRAWINGS

FIG. 4A shows a table for managing characters which are manipulated by a player;

FIG. 4B shows a table for managing opponent characters which are controlled by the server;

EXPLANATION OF REFERENCE NUMERALS

Figure 1:
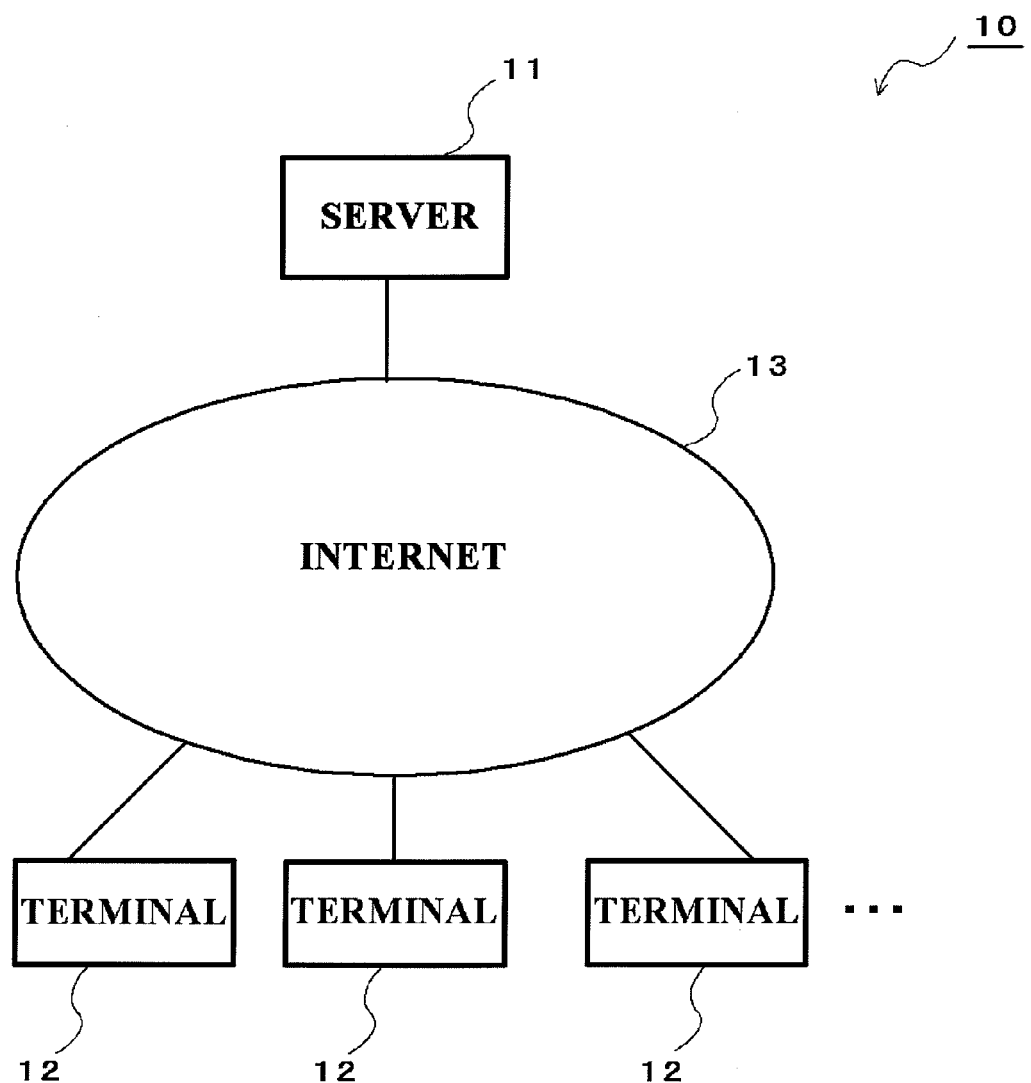
FIG. 1 is an exemplary diagram showing the schematic configuration of a network game system according to the present embodiment.

10 network game system
11 server
12 terminal
13 Internet
100 game device
101 CPU
102 ROM 103 RAM
104 interface
105 controller
106 external memory
107 DVD-ROM drive
108 image processing unit
109 sound processing unit
110 NIC
201 reception unit
202 terminal management unit
203 event generation unit
204 judgment unit
205 game situation update unit
206 transmission unit
301 image storage unit
302 data reception unit
303 game image generation unit
304 operation acceptance unit
305 game situation management unit
306 data transmission unit
307 display unit
601 scene change unit

BEST MODE FOR CARRYING OUT THE INVENTION

Embodiments of the present invention will be described below.

(First Embodiment)

FIG. 1 is an exemplary diagram showing the schematic configuration of a network game system according to an embodiment of the invention, which will be described below with reference to the accompanying drawings.

In the network game system 10, a server 11 which manages the whole system is located on an Internet 13 as one example. Each terminal 12 in the network game system 10 is connected in a communicatable manner to the server 11 over the Internet 13.

The individual terminals 12 share the same virtual space (game space), and their respective players can manipulate different characters (local characters).

For easier understanding of the invention, an internet enabled game device labeled as terminal 12 will be described below by way of example. Besides a game device, various information processing apparatuses, such as a computer, a PDA and a cellular phone, can be used as terminals.

Figure 2:
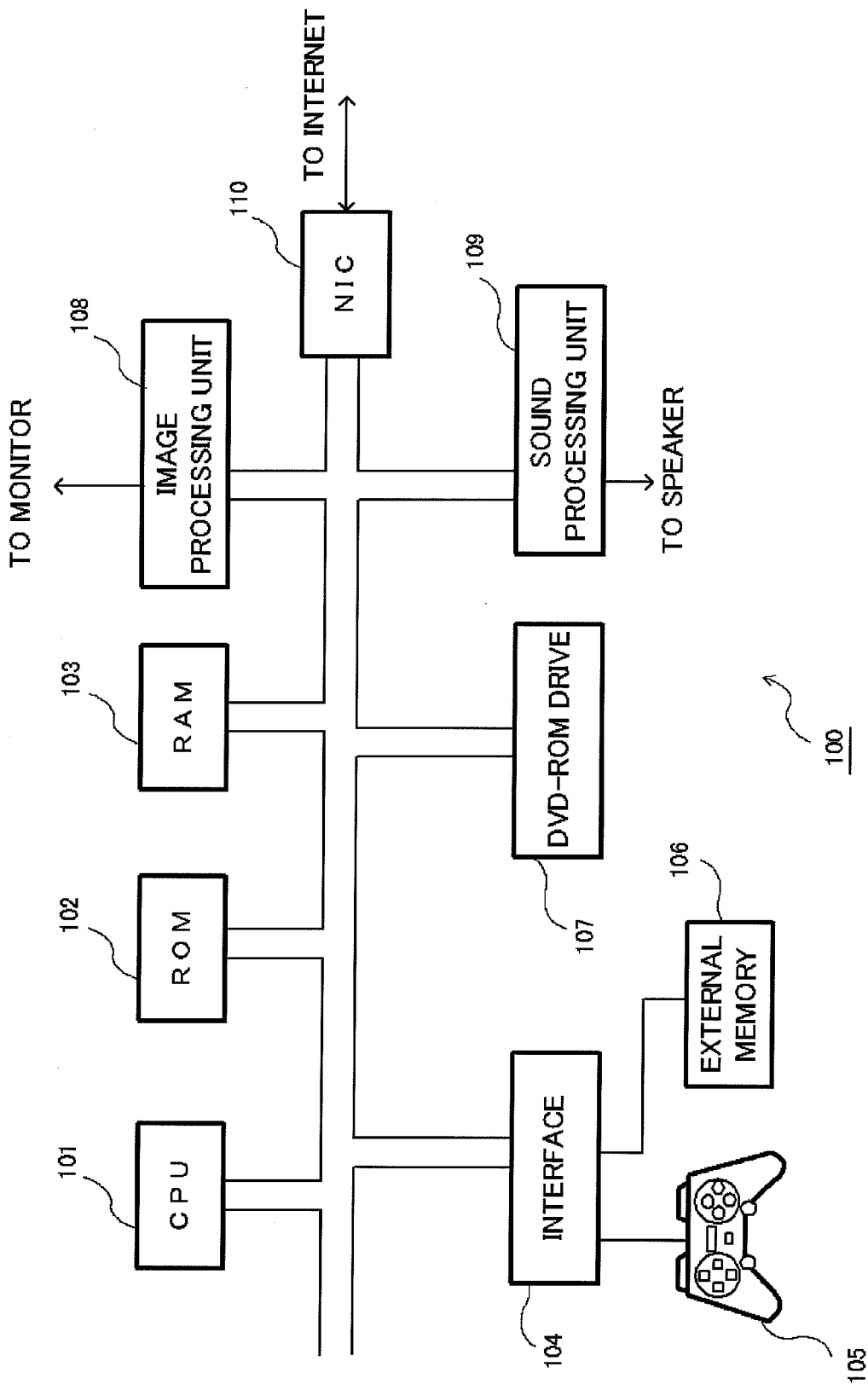
FIG. 2 is an exemplary diagram showing the schematic configuration of a game device according to the embodiment.

FIG. 2 is an exemplary diagram showing the schematic configuration of a game device 100 which functions as the terminal 12 according to the embodiment. The following description will be given referring to the diagram.

The game device 100 has a CPU (Central Processing Unit) 101, a ROM (Read Only Memory) 102, a RAM (Random Access Memory) 103, an interface 104, a controller 105, an external memory 106, a DVD (Digital Versatile Disk)-ROM drive 107, an image processing unit 108, a sound processing unit 109, and an NIC (Network Interface Card) 110.

As a DVD-ROM storing a program and data for a game is loaded into the DVD-ROM drive 107 and the game device 100 is powered on, the program is executed to realize a terminal 12 which executes the game according to the embodiment.

The CPU 101 controls the general operation of the game device 100 to be connected to the individual components to exchange control signals and data.

When an IPL (Initial Program Loader) to be executed immediately after power-on and recorded in the ROM 102 executes, a program recorded in the DVD-ROM is loaded into the RAM 103, and the CPU 101 starts executing the program. Recorded in the ROM 102 are programs of the operating system and various kinds of data, which are needed to control the general operation of the game device 100.

A program and data read from the DVD-ROM and other data needed for progressing the game and chat communication are held in the RAM 103 which temporarily stores data and a program.

The controller 105 connected via the interface 104 accepts an operation input at the time a user plays the game. For example, the controller 105 may accept as an input, a sequence of characters (messages), according to the operation input.

Data indicating the progress state of the game, data on the log (record) of chat communication, etc. are rewritably stored in the external memory 106 detachably connected via the interface 104. The user can input an instruction via the controller 105 to properly record those pieces of data in the external memory 106.

A program for realizing the game, and image data and audio data accompanying the game are recorded in the DVD-ROM to be loaded into the DVD-ROM drive 107. Under control of the CPU 101, the DVD-ROM drive 107 performs a read process on the DVD-ROM loaded into the DVD-ROM drive 107 to read necessary program and data, which are temporarily stored in the RAM 103 or the like.

The image processing unit 108 processes data read from the DVD-ROM by means of the CPU 101 and an image processor (not shown) provided in the image processing unit 108, and then records the data into a frame memory (not shown) provided in the image processing unit 108. The image information recorded in the frame memory is converted to a video signal at a predetermined sync timing, and output to a monitor (not shown) connected to the image processing unit 108. This makes it possible to display various images.

The image processor can execute an overlay operation of two-dimensional images, a transparent operation, such as a blending, and various saturation operations at a high speed.

It is also possible to carry out fast execution of an operation of rendering polygon information, located in a virtual three-dimensional space and added with various kinds of texture information, by Z buffering to acquire a rendered image downward-viewing a polygon located in the virtual three-dimensional space from a viewpoint position.

Further, the CPU 101 and the image processor can cooperate to write a character sequence as a two-dimensional image into the frame memory or onto the surface of each polygon according to font information defining the form of characters. Although the font information is recorded in the ROM 102, dedicated font information recorded in the DVD-ROM may be used.

The sound processing unit 109 converts audio data read from the DVD-ROM to an analog audio signal, and outputs the audio signal from a speaker (not shown) connected to the sound processing unit 109. Under control of the CPU 101, the sound processing unit 109 generates effect sounds and music data to be generated as the game progresses, and outputs sounds corresponding thereto from the speaker.

The NIC 110 serves to connect the game device 100 to a computer communication network (not shown), such as the Internet, and includes an analog modem which is compatible with the 10BASE-T/100BASE-T to be used at the time of constructing a LAN (Local Area Network) or connects to the Internet using a telephone circuit, an ISDN (Integrated Services Digital Network) modem, an ADSL (Asymmetric Digital Subscriber Line) modem, a cable modem to connect to the Internet using a cable television circuit, or the like, and an interface (not shown) which interfaces between those modems and the CPU 101.

In addition, the game device 100 may be configured to achieve the same functions as the ROM 102, the RAM 103, the external memory 106 and the DVD-ROM to be loaded into the DVD-ROM drive 107 by using a large-capacity external memory device, such as a hard disk.

Further, the game device 100 may adopt the mode of being connected with a keyboard for accepting an input for edition of a character sequence from the player, a mouse for accepting inputs for designating and selecting various positions, and the like.

In place of the game device 100 according to the embodiment, a general computer (general-purpose personal computer or the like) may be used as a game device. For example, a general computer is configured to have, like the game device 100, a CPU, RAM, ROM, DVD-ROM drive and NIC, and have an image processing unit with simpler functions than those of the game device 100, and a hard disk as an external memory device, and to be able to additionally use a flexible disk, a magneto-optical disk, a magnetic tape or the like. In addition, a keyboard and a mouse or the like, not a controller, are used as an input device. When a game program is installed and executed, the general computer functions as a game device.

The server in the network game system according to the invention will be described below in detail.

(Schematic Configuration of Server)

Figure 3:
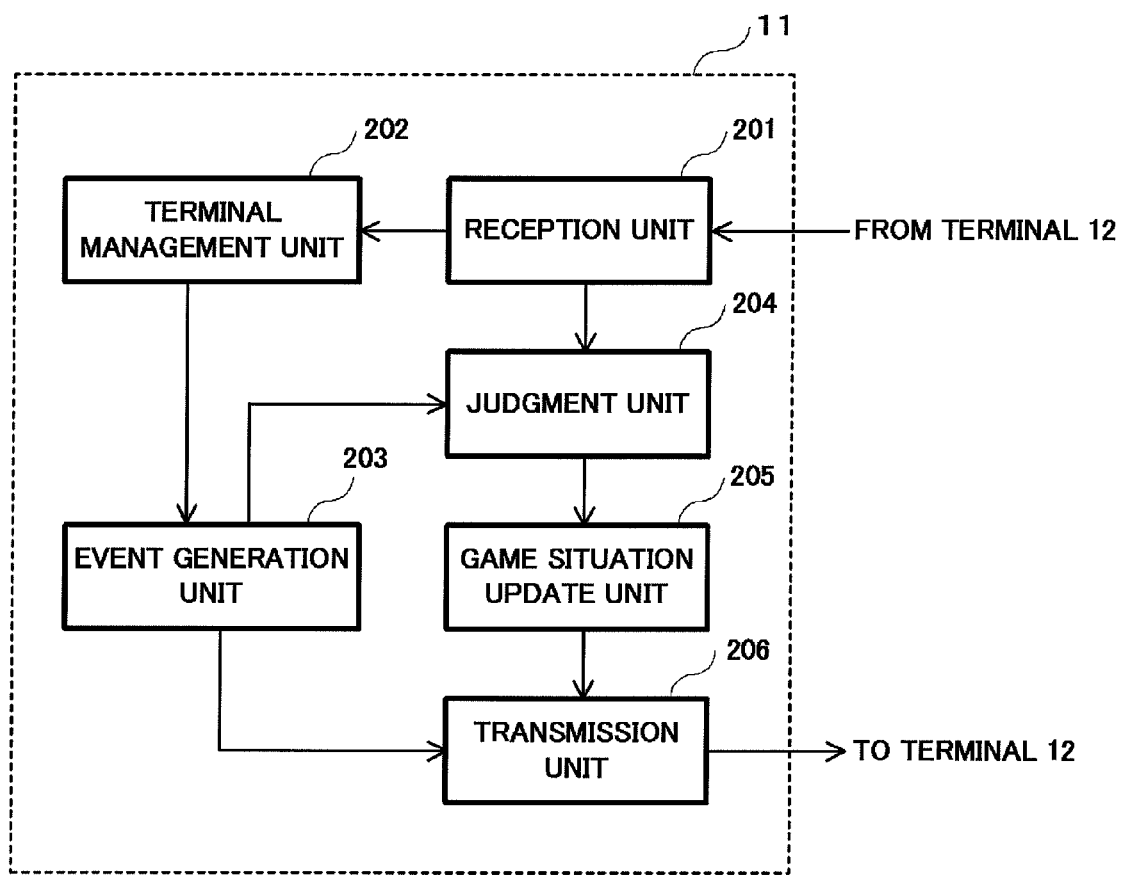
FIG. 3 is an exemplary diagram showing one example of the schematic configuration of a server.

FIG. 3 is an exemplary diagram showing one example of the schematic configuration of the server 11 according to the embodiment. The description will be given below referring to FIG. 3.

The server 11 includes a general computer (general-purpose personal computer or the like) having a CPU, RAM, ROM, DVD-ROM drive, NIC, etc., and has a reception unit 201, a terminal management unit 202, an event generation unit 203, a judgment unit 204, a game situation update unit 205, and a transmission unit 206, as shown in FIG. 3.

The reception unit 201 receives various kinds of data transmitted from each terminal 12.

For example, the reception unit 201 receives data, such as operation instructions, such as movement, and various commands (e.g., to use magic) to a character. The reception unit 201 also receives information on the current state of a character, e.g., the level, HP (Hit Point), MP (Magic Point), empirical value, carrying money, and carrying items, and information on the progress state of the game, e.g., the current position or movable range on a map or a field, the number of defeated boss characters, and the number of cleared stages.

It should be noted that the NIC can function as the reception unit 201.

The terminal management unit 202 manages information of each terminal 12. For example, the terminal management unit 202 manages the progress state of the game on each terminal 12 based on the information received by the reception unit 201. The progress state of the game includes information on characters to be manipulated by the individual terminals 12 (individual players) and information on characters (opponent characters, NPC, etc.) which are controlled by the server 11.

The characters to be manipulated by the terminals 12 are managed by a character table as shown in FIG. 4A. The characters (e.g., an appeared opponent character) which are controlled by the server 11 are managed by an opponent character table as shown in FIG. 4B.

The character table shown in FIG. 4A is properly updated based on data or the like received by the reception unit 201.

When the player performs an operation to move a character A (e.g., character ID: C-234), for example, data on the operation is received by the reception unit 201, so that the terminal management unit 202 updates the current position and direction of the character A in the character table according to the movement. When the player performs an operation to allow the character A to exercise magic, data on the operation is likewise received by the reception unit 201, so that the terminal management unit 202 decreases the value of the MP of the character A in the character table by the amount consumed.

At the time the character A battles with an opponent character B (e.g., opponent character ID: M-467), the value of the HP of the character A is decreased by the damage received from the opponent character B. When the opponent character B is defeated, a manual operation is verified after addition of the money carried, addition of the empirical value of the character A, addition of an item, or the like is carried out as will be described later.

The opponent character table shown in FIG. 4B is properly updated according to a predetermined logic.

When an opponent character D (e.g., opponent character ID: C-611) is located near an opponent character C (e.g., opponent character ID: M-467), for example, the terminal management unit 202 updates the current position and direction of the opponent character C in the opponent character table in such a way as to move the opponent character C toward the character D.

When a battle between the opponent character C and the character D eventually starts, the value of the HP of the opponent character C in the opponent character table is decreased by the damage received from the character D. When the character D is damaged by the opponent character C, on the other hand, the value of the HP of the character D in the character table is decreased by the damage as mentioned above.

It should be noted that the aforementioned CPU, RAM, etc. can function as such a terminal management unit 202.

Returning to FIG. 3, based on the progress state of the game on each terminal 12 to be managed by the terminal management unit 202, the event generation unit 203 causes a target terminal 12 to generate a verification event for verifying a player's manual operation.

For example, based on the progress state, such as at the time of defeating an opponent, at the time of clearing a stage or the like, at the time of updating a highest score or the like, and at the time of demanding necessary characters (password or the like), the event generation unit 203 causes the terminal 12 to generate a verification event.

An example of a verification event is when the game device displays a verification image generated by the server 11 and prompts the player to perform an operation according to the verification image.

The verification image is, for example, an image in which a specific image (specific object or the like) is positioned at an arbitrary position, and which causes the player to specify the verification image (answer the position of the specific image).

Figure 5A:
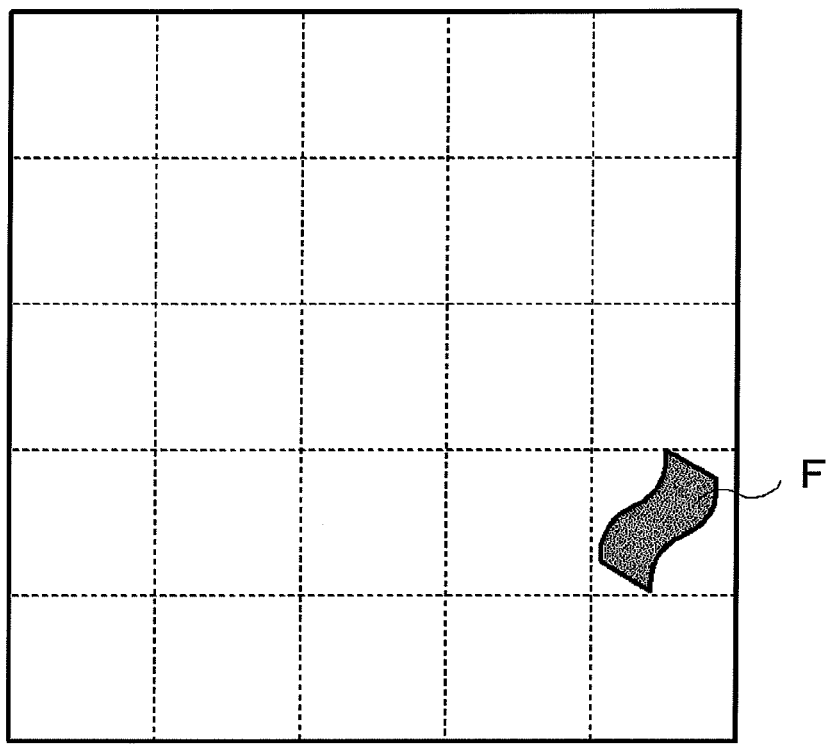
FIG. 5A is an exemplary diagram for explaining generation of a verification image.

Specifically, the event generation unit 203 selects one zone, at random, from an area segmented into a plurality of zones as shown in FIG. 5A. Then, the event generation unit 203 places a bill image F as a specific image in the selected zone. Information on the zone where the bill image F is placed is managed only within the server 11.

Figure 5B:
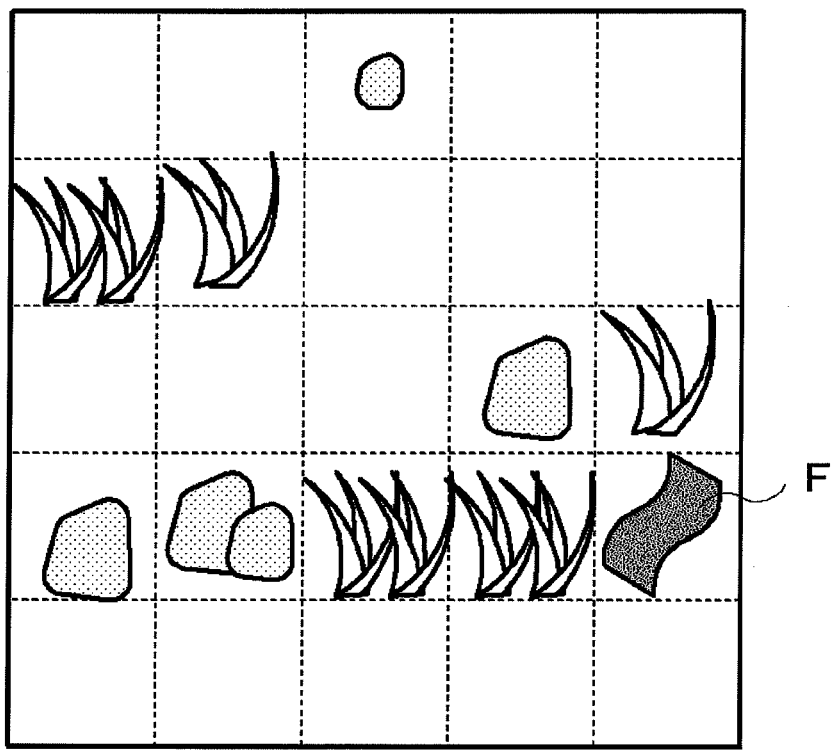
FIG. 5B is an exemplary diagram for explaining generation of the verification image.

Subsequently, the event generation unit 203 selects a predetermined number of zones at random in, such a way that the zones do not overlap with one another, excluding the zone where the bill image F is placed. (If the zones overlap one another, zones are selected at random again.) Then, another image is placed in each selected zone. That is, the image of a stone and the image of grass are adequately placed as shown in FIG. 5B.

Figure 5C:
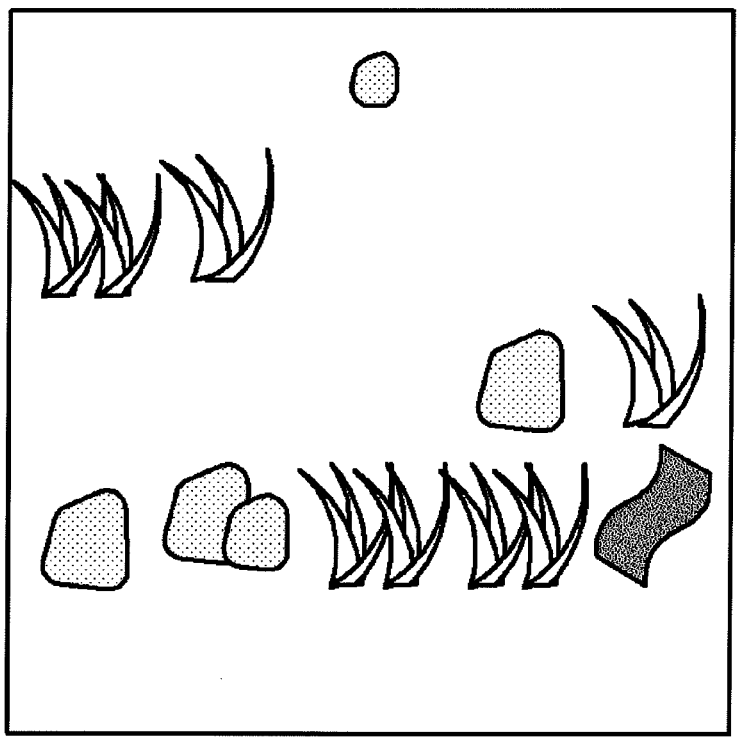
FIG. 5C is an exemplary diagram for explaining generation of the verification image.

In this manner, the event generation unit 203 generates a single (a combined) verification image as shown in FIG. 5C which has a specific image or the like placed therein. That is, the verification image does not include any information indicating where the bill image F as a specific image is placed, so that the position of the bill image F is not seen unless it is judged by human eyes.

Figure 5D:
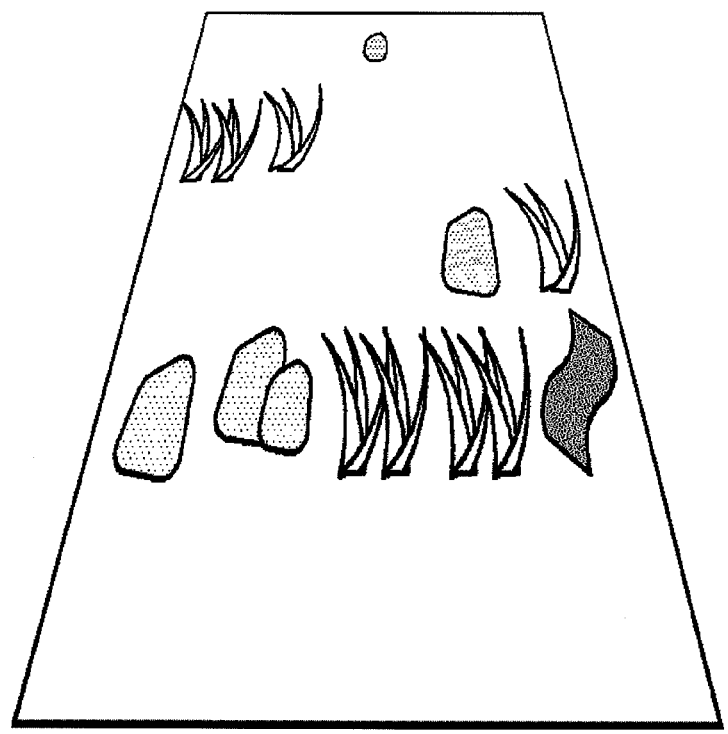
FIG. 5D is an exemplary diagram for explaining generation of the verification image.

The verification image shown in FIG. 5C is an image for a ground, as one example, which is arranged (combined) as the ground in the virtual space as shown in FIG. 5D when it is transmitted to the terminal 12 by the transmission unit 206 to be described later.

It should be noted that the aforementioned CPU, etc. can function as such an event generation unit 203.

Returning to FIG. 3, the judgment unit 204 judges if a manual operation is performed by the player, based on the operation information (information indicating the contents of the operation) transmitted from the terminal 12 which has been caused to generate the verification image by the event generation unit 203.

For example, when the aforementioned verification image s transmitted to the target terminal 12 from the server 11; the judgment unit 204 judges if the player has performed a manual operation based on the operation information returned from the terminal 12. That is, it is determined whether A character (player) could specify (select) a specific image (bill image F) included in the verification image. The following description will be given specifically referring to FIG. 6.

Figure 6A:
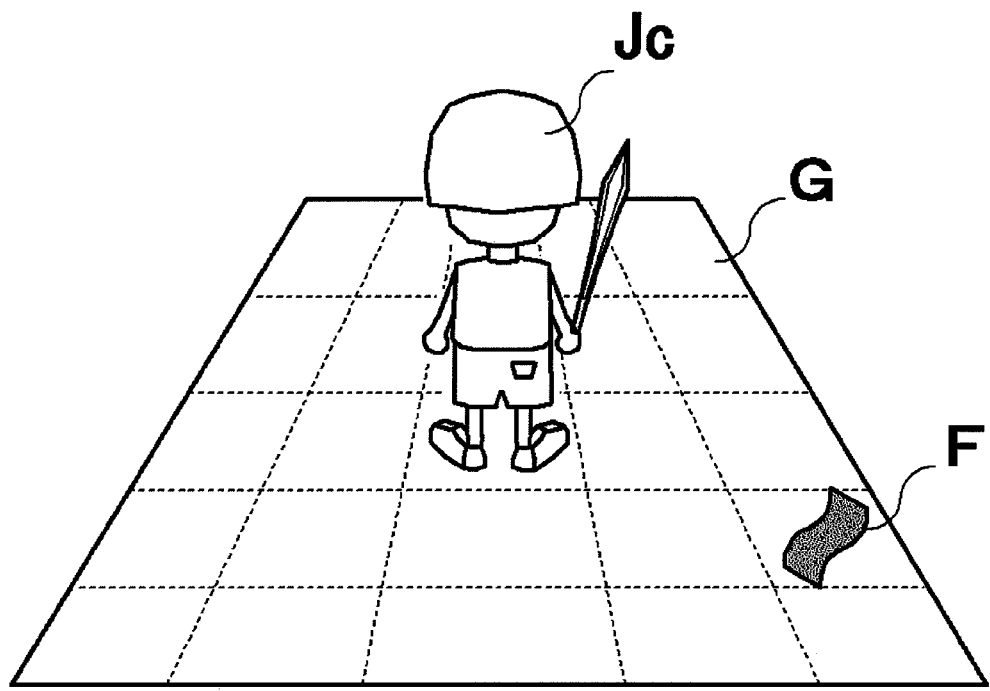
FIG. 6A is an exemplary diagram for explaining contact of a character with a bill object.

When the aforementioned verification event is generated, the as shown in FIG. 6A, the terminal 12 arranges (combines) a verification image G generated by the event generation unit 203 on the ground, and displays it. Then, a character Jc to be manipulated by the player can move on the verification image G Operation information at the time the player moves the character Jc is transmitted to the server 11.

Then, the judgment unit 204 receives the operation information transmitted from the terminal 12 via the reception unit 201, and judges whether a manual operation has been performed. For example, the judgment unit 204 determines from the received operation information whether the bill image F has been picked up, and judges the presence/absence of the manual operation based on the discrimination.

Figure 6B:
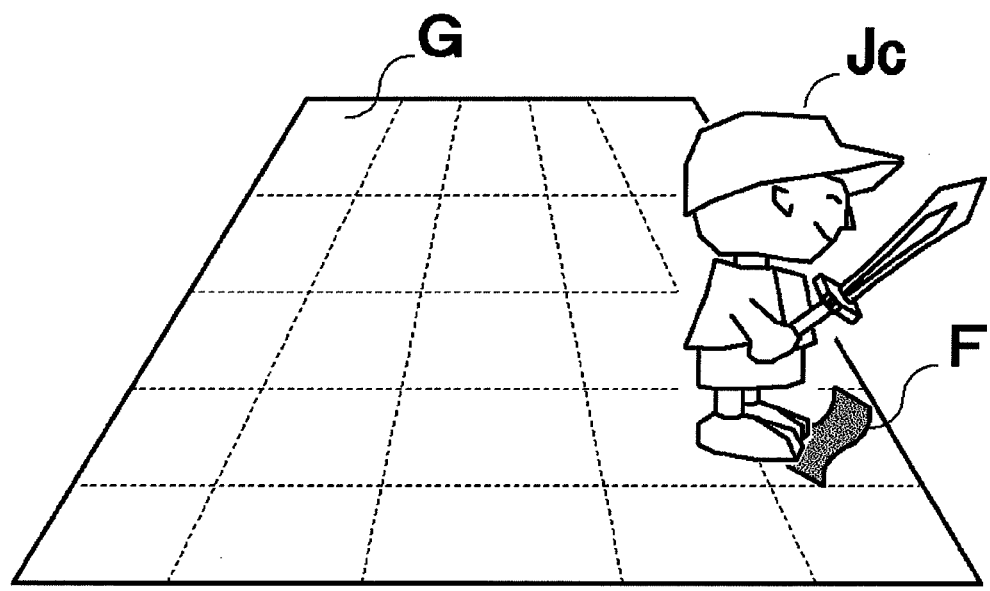
FIG. 6B is an exemplary diagram for explaining contact of the character with the bill object.

That is, in case where the player is playing normally, when the verification image G (bill image F) is displayed, the player moves the character Jc to the position of the bill image F as shown in FIG. 6B to pick up the bill image F. Then, the player instructs the character Jc to perform an operation of picking up the bill image F.

Therefore, when acquiring the position of the character Jc (position at which the pickup operation has been performed) from the operation information indicating such operation contents, the judgment unit 204 compares the position with the real position of the bill image F. When both positions match each other, it is judged that the player has performed the manual operation.

When both positions do not match each other, or a predetermined time has elapsed without giving an instruction for the pickup operation, the judgment unit 204 judges that the terminal 12 Jc could not select the bill image F. That is, it is judged (or it is likely to be judged) that the player has not performed the manual operation.

It should be noted that the aforementioned CPU, etc. can function as such a judgment unit 204.

Returning to FIG. 3, the game situation update unit 205 updates the game situation on the terminal 12 based on the result of judgment of the judgment unit 204.

When it is judged that the manual operation has been performed, for example, the game situation update unit 205 updates the game situation in such a way as to be advantageous for the player. For example, the carrying money, the empirical value or the like of the character (player character) is gained, or a predetermined item or the like is given. In addition, the character may be allowed to make a predetermined action in the game. As an example, a door is opened to permit further advancement, a map or a field in a game is expanded to widen the range of action, or predetermined information can be viewed/transmitted by acceptance of log-in or the like.

When it is (likely to be) judged that the manual operation has not been performed, on the other hand, the game situation update unit 205 does not update the game situation thereby not giving any advantage. If it is then judged that the manual operation has been performed by a predetermined number of times (predetermined number of events), or the like, the game image may barely be updated thereby making the game disadvantageous.

For example, the carrying money, the empirical value or the like of the character may be decreased or a predetermined item or the like may be removed. In addition, the action in the game may be restricted. As an example, a door is closed to inhibit further advancement (retracing), a map or a field in the game is reduced to narrow the range of action, or log-out is carried out so that information will not be acquired.

It should be noted that the aforementioned CPU, etc. can function as such a game situation update unit 205.

Returning to FIG. 3, the transmission unit 206 transmits various kinds of information needed for the game to each terminal 12.

For example, the transmission unit 206 sequentially transmits information on the individual characters (player character, an opponent character, etc.) which are managed by the terminal management unit 202 to the individual terminals 12.

Accordingly, in each terminal 12, not only is the operation by the local terminal 12 reflected in the common virtual space, but also the movement of its character according to operations performed by other terminals 12 is reflected in the common virtual space.

For the event generation unit 203 to generate a verification event in the terminal 12, the transmission unit 206 transmits predetermined information to the terminal 12. For example, a verification image generated by the event generation unit 203 is transmitted to the terminal 12. That is, the aforementioned verification image generated to have the bill image F as shown in FIG. 5B or the like placed at a random position (zone) is transmitted to the target terminal 12.

Further, the transmission unit 206 transmits information on the game situation updated by the game situation update unit 205 to the target terminal 12. That is, the updated game situation is reflected on the terminal 12.

It should be noted that the aforementioned CPU, etc. can function as such a transmission unit 206.

(Schematic Configuration of Terminal)

Figure 7:
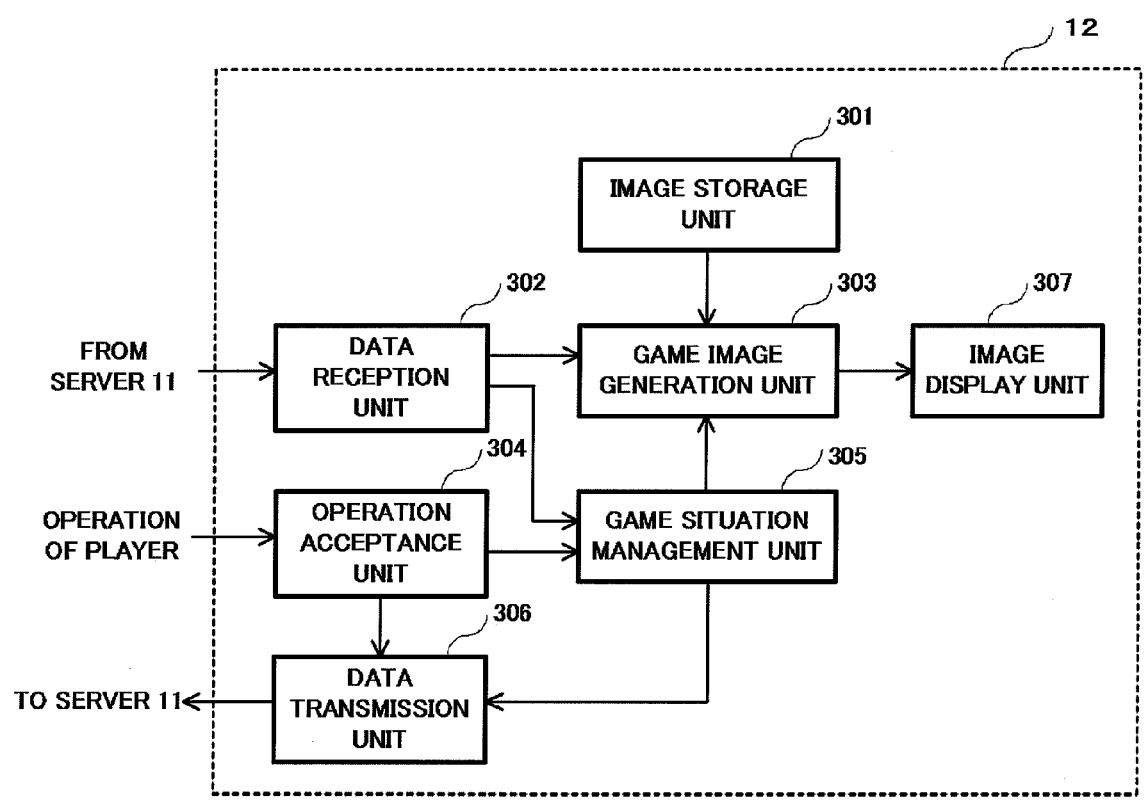
FIG. 7 is an exemplary diagram showing one example of the schematic configuration of a terminal.

FIG. 7 is an exemplary diagram showing one example of the schematic configuration of the terminal 12 according to the embodiment. The description will be described below referring to FIG. 7.

As shown in FIG. 7, the terminal 12 has an image storage unit 301, a data reception unit 302, a game image generation unit 303, an operation acceptance unit 304, a game situation management unit 305, a data transmission unit 306, and an image display unit 307.

The image storage unit 301 stores images (objects) of characters to be placed in the virtual space (characters to be respectively manipulated by the individual players), opponent characters, trees, buildings, and so forth.

It should be noted that the aforementioned RAM 103, etc. can function as such an image storage unit 301.

The data reception unit 302 receives various kinds of information transmitted from the server 11.

For example, the data reception unit 302 sequentially receives information on all the characters (player character and opponent characters or the like) which are managed by the terminal management unit 202 of the server 11.

The data reception unit 302 also receives a verification event generated by the server 11 (event generation unit 203). For example, the data reception unit 302 receives the aforementioned verification image as shown in FIG. 5C.

Furthermore, the data reception unit 302 receives information transmitted from the server 11 (game situation update unit 205), and reflects the information on the game situation management unit 305.

It should be noted that the aforementioned NIC 110 can function as such a data reception unit 302.

The game image generation unit 303 generates a game image including a character to be placed in the virtual space.

For example, the game image generation unit 303 may generate a game image where an image (object) stored in the image storage unit 301 is placed in the virtual space. At that time, the game image generation unit 303 generates a game image where the player character and an opponent character are adequately arranged, based on positional information (current position, direction, etc.) of individual characters received by the data reception unit 302.

Figure 8:
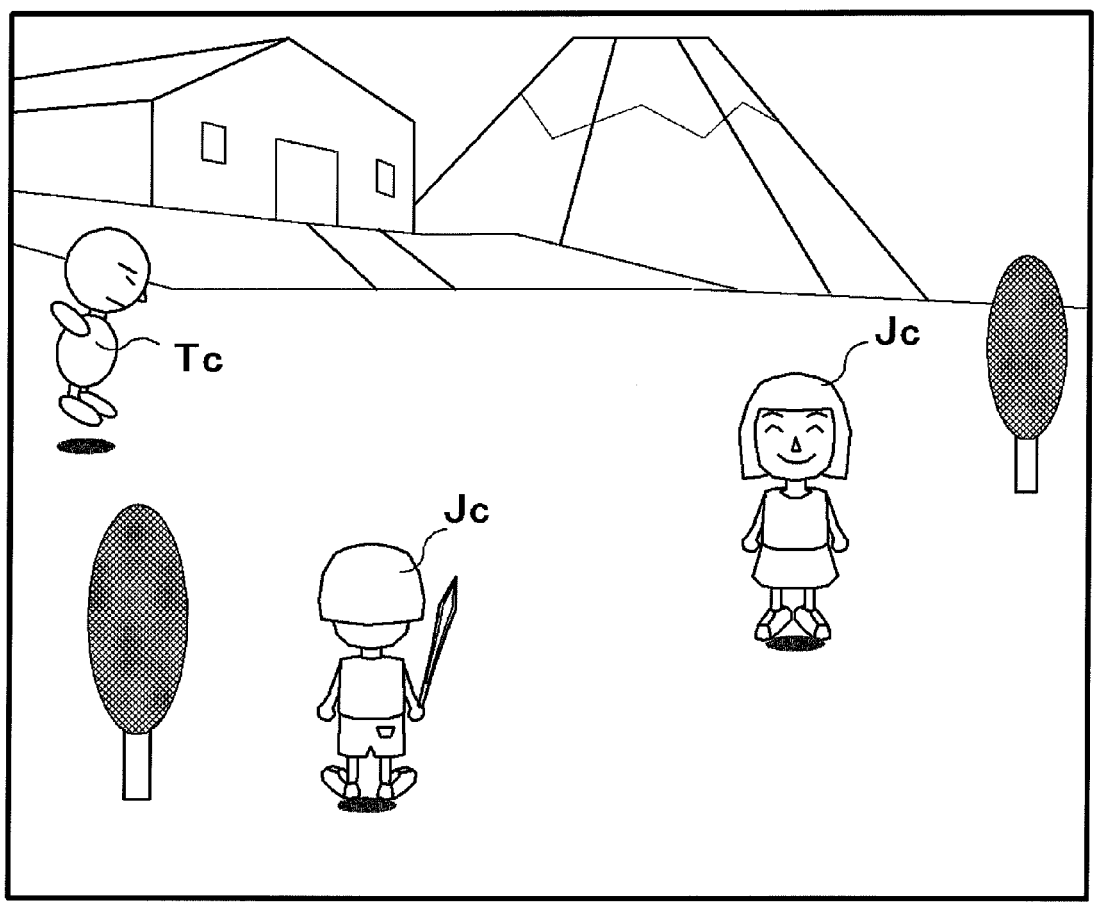
FIG. 8 is an exemplary diagram showing one example of a game image to be generated.

As an example, the game image generation unit 303 generates a game image where a player character Jc and an opponent character Tc as shown in FIG. 8 are arranged in the virtual space, based on the position information of the individual characters.

The game image generation unit 303 also generates an image according to the verification event generated by the server 11. When a verification image is transmitted from the server 11, for example, the game image generation unit 303 combines the verification image with the game image.

Figure 9:
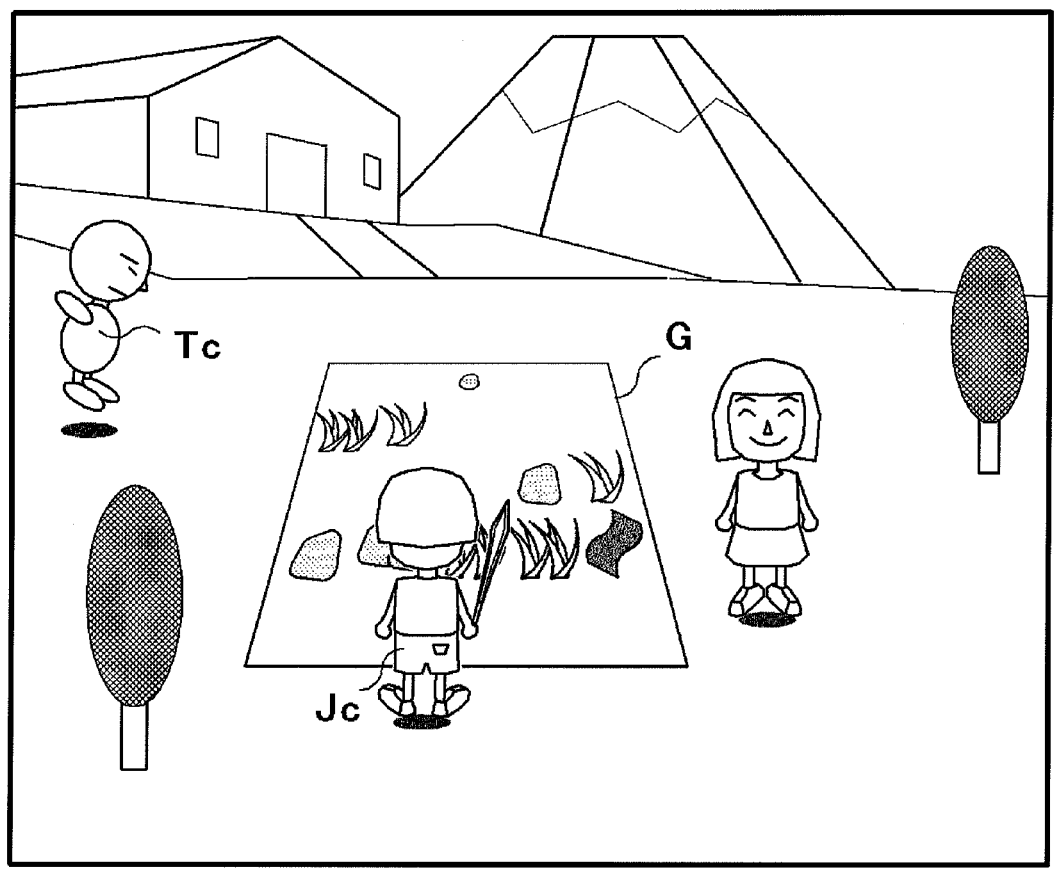
FIG. 9 is an exemplary diagram showing one example of a game image having a verification image combined thereinto.

Specifically, upon reception of the verification image as shown in FIG. 5C, the game image generation unit 303 places the verification image on the ground near the target character to be combined with the game image. That is, as shown in FIG. 9, the verification image G is placed on the ground near the character Jc (character to be manipulated by the player) to be combined with the game image.

It should be noted that the aforementioned image processing unit 108 can function as such a game image generation unit 303.

Returning to FIG. 7, the operation acceptance unit 304 accepts an operation input, such as a move instruction, to a local character the player manipulates. For example, when one of a plurality of buttons (direction keys, A button, B button, X button, Y button, etc. arranged on the controller 105 as one example) corresponding to an operation, such as movement in a predetermined direction, swinging of a sword, exercising of magic or pickup of an object, is pressed by the player, the operation acceptance unit 304 accepts the operation input to the hero/heroin character.

It should be noted that the aforementioned controller 105 can function as such an operation acceptance unit 304.

The game situation management unit 305 manages the game situation including the progress state of the game on the terminal 12. For example, the game situation management unit 305 manages information on the level, HP (Hit Point), MP (Magic Point), empirical value, carrying money, and carrying items of a character, and information on the current position or movable range on a map or a field, the number of defeated boss characters, and the number of cleared stages.

The game situation management unit 305 manages the game situation of the player according to information received from the server 11 by the data reception unit 302, and operation information or the like accepted by the operation acceptance unit 304. For example, the game situation management unit 305 manages the game situation while properly reflecting (updating) the contents to be updated by the server 11 (game situation update unit 205).

It should be noted that the aforementioned RAM 103 and CPU 101 can function as such a game situation management unit 305.

The data transmission unit 306 transmits the contents of the operation (operation information) accepted by the operation acceptance unit 304 to the server 11. That is, the data transmission unit 306 transmits operation information of the character manipulation by the player to the server 11.

In addition, the data transmission unit 306 transmits information to be managed by the game situation management unit 305 to the server 11. For example, the data transmission unit 306 transmits the progress state of the game on the terminal 12 to the server 11.

It should be noted that the aforementioned NIC 110 can function as such a data transmission unit 306.

The image display unit 307 displays an image generated by the game image generation unit 303. That is, the image display unit 307 displays the game image as shown in FIG. 8 or FIG. 9.

It should be noted that a monitor connected to the aforementioned image processing unit 108 can function as such a image display unit 307.

By the way, while the terminal 12 is configured by those components, a program, e.g., a script, generates operation information in place of the operation acceptance unit 304, when a Bot-originated automatic operation is performed. That is, the operation information is transmitted to the server 11 via the data transmission unit 306 or the like as if it were operation information indicating operation contents accepted by the operation acceptance unit 304.

Accordingly, as described above, the judgment unit 204 of the server 11 attempts to verify if the operation information is a manual operation to be performed by the player.

(Outline of Operations of Server and Terminal)

Figure 10:
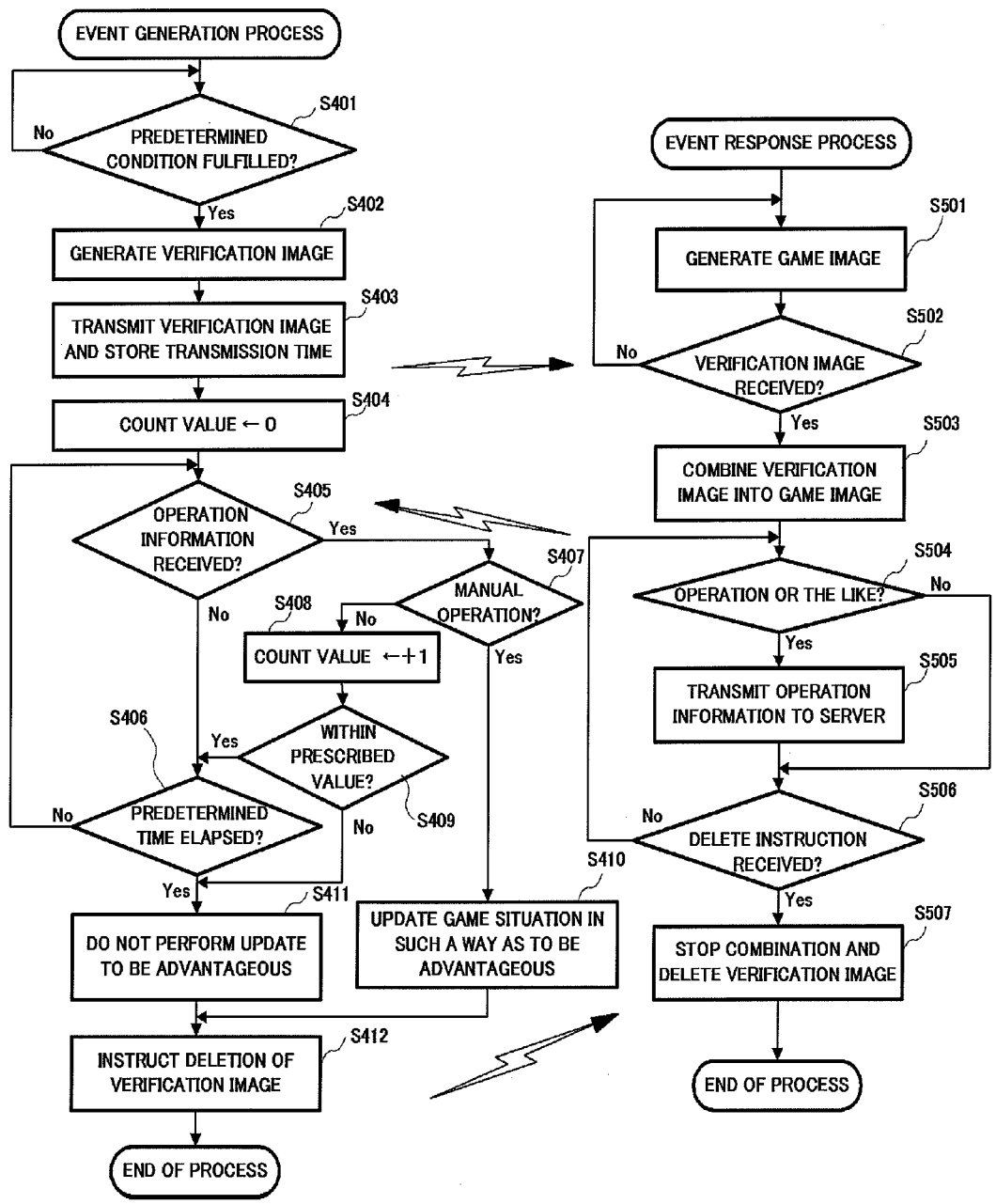
FIG. 10 is a flowchart illustrating one example of an event generation process and an event response process according to the embodiment of the invention.

FIG. 10 is a flowchart illustrating the flows of an event generation process to be executed by the server 11 with the foregoing configuration, and an event response process to be executed by the terminal 12. The operations of the server 11 and the terminal 12 will be described below referring to FIG. 10.

First, the server 11 stands by for execution of a subsequent process until the progress state of the game on the terminal 12 fulfills a predetermined condition (step S401; No). When a character defeating an opponent is set as a condition, for example, the server 11 stands by until the condition is fulfilled. It should be noted that if there are other conditions, the other conditions are determined. For example, the server 11 stands by until a condition, such as a stage or the like being cleared or a highest score being obtained, is fulfilled.

Then, when the condition is fulfilled (step S401; Yes), the server 11 generates a verification image (step S402).

That is, the event generation unit 203 generates a verification image for verifying a manual operation by the player.

Specifically, the event generation unit 203 generates a verification image as shown in FIG. 5C which has a bill image placed therein at a random position.

The server 11 transmits the verification image to the target terminal 12, and stores a transmission time (step S403).

That is, the transmission unit 206 transmits the generated verification image to the terminal 12 whose progress state of the game has fulfilled a predetermined condition, and stores the transmission time. The transmission time is used as a reference time (start time) for judging the duration between the transmission time and the response of terminal 12.

The server 11 sets an initial value to a count value (step S404). The count value is a value for measuring the number of times the player has made erroneous operations (the player could not pick up the bill image) when the verification image is displayed on the terminal 12.

Turning to the description of the process of the terminal 12, the terminal 12 generates a game image (step S501).

For example, the game image generation unit 303 generates a game image which has the player character and an opponent character adequately arranged therein based on the positional information (current position, direction, etc.) of individual characters transmitted from the server 11.

It should be noted that the step S501 is executed in every iteration of the event response process.

The terminal 12 determines whether the verification image is received (step S502).

That is, the terminal 12 determines whether the verification image transmitted from the server 11 in the step S403 is received.

When having determines that the verification image is not received (step S502; No), the terminal 12 returns the process to step S501.

Upon reception of the verification image (step S502; Yes), on the other hand, the terminal 12 combines the verification image into the game image (step S503).

That is, the game image generation unit 303 generates a game image where the received verification image is arranged close to the target character.

Specifically, the game image generation unit 303 arranges the verification image G on the ground close to the character Jc to be combined into the game image as shown in FIG. 9.

The terminal 12 determines whether there has been an operation or the like of the operation acceptance unit 304. That is, the terminal 12 determines whether there has been an operation too the character while the verification image is combined and displayed. When a Bot-originated automatic operation is performed, operation information indicating as if the operation acceptance unit 304 were operated by a program, e.g., a script, is generated.

When having determined that there is no such operation or the like (step S504; No), the terminal 12 proceeds the process to step S506 to be described later.

When having determined that there is an operation or the like (step S504; Yes), on the other hand, the terminal 12 transmits operation information originated from the operation or the like to the server 11 (step S505). That is, at the time the verification image is displayed, the operation information accepted by the operation acceptance unit 304 or movement information generated by the program, e.g., the script, is transmitted to the server 11.

Returning to the process of the server 11, the server 11 determines whether the operation information has been received (step S405).

That is, the server 11 determines whether the operation information transmitted from the terminal 12 in the step S505 has been received.

When having determined that the operation information has not been received (step S405; No), the server 11 determines whether a predetermined time has elapsed (step S406).

That is, the time elapsed since transmission of the verification image is acquired by subtracting the reference time stored in step S403 from the current time, and it is determined whether the elapsed time has exceeded a predetermined time (whether the time is over).

When having determined that the predetermined time has not elapsed yet (step S406; No), the server 11 returns the process to step S405. When having determined that the predetermined time has elapsed (step S406; Yes), on the other hand, the server 11 proceeds the process to step S411:

Upon reception of the operation information from the terminal 12 in the step S405 (step S405; Yes), the server 11 verifies if the operation is a manual operation performed by the player (step S407).

That is, based on the received operation information, the judgment unit 204 determines whether the bill image is picked up to verify if a manual operation has been performed. Specifically, it is determined whether the position of the character Jc (position at which the pickup operation is instructed) matches with the position of the bill image F in the verification image G as shown in FIG. 6B. In other words, when the player is playing normally, the player views the verification image G (bill image F), and instructs the character Jc to pick up the bill image F.

If the position of the character Jc matches with the position of the bill image F based on the operation information, it is possible to judge that the player has performed a manual operation.

When both positions do not match each other, however, the operation may doubtfully be a Bot-originated automatic operation, but may be originated from an erroneous operation (miss operation) of the player, so that it cannot be concluded at this point of time.

When the server 11 cannot verify a manual operation (step S407; No), the server 11 increments the count value by "1" (step S408). Then, the server 11 determines whether the count value lies within a prescribed value (e.g., within three times) (step S409).

When having determined that the count value lies within the prescribed value (step S409; Yes), the server 11 proceeds the process to the step S406. That is, because there may be a case of a Bot-originated automatic operation and a case of an erroneous operation of the player at this point of time, the server 11 waits for next operation information. Accordingly, the player is given a chance to perform an operation again until a predetermined time elapses even when the player has made an erroneous operation (the bill image could not be picked up). When a sufficient large value (e.g., infinity or the like) is set to the prescribed value, the player is given a chance to perform an operation again within the predetermined time no matter how many times the player makes erroneous operations.

When having determined that the count value has elapsed the prescribed value (step S409; No), on the other hand, the server 11 proceeds the process to step S411 to be described later. That is, when the upper limit of the count value (the number of errors made by the player) is set by the prescribed value and the count value exceeds the prescribed value, the process proceeds to step S411 even before the predetermined time elapses. In other words, because it is unlikely that the player would makes erroneous operations that many times, it is very likely that a Bot-originated automatic operation is being performed.

When proper operation information is transmitted from the terminal 12 before the predetermined time elapses (or before the count value exceeds the prescribed value) so that the server 11 verifies that the operation is a manual operation (step S407; Yes), the server 11 updates the game situation in such a way as to be advantageous for the player (step S410).

For example, the money carrying, the empirical value, or the like of the character is gained, or a predetermined item or the like is given. In addition, the character may be allowed to make a predetermined action in the game. As an example, a door is opened to permit further advancement, a map or a field in a game is expanded to widen the range of action, or predetermined information can be viewed/transmitted by acceptance of log-in or the like.

On the other hand, when the count value exceeds the prescribed value without verifying a manual operation even if operation information is received multiple times (step S409; No), or when the predetermined time elapses without receiving operation information (step S406; Yes), the server 11 does not update the game situation thereby giving no advantage (step S411).

That is, the game situation update unit 205 does not update the game situation at all, or rather updates the game situation in such a way as to be disadvantageous for the player.

At the time of defeating an opponent, for example, the money carrying, the empirical value or the like of the character is decreased, or a predetermined item or the like is removed. In addition, the action in a game may be restricted. As an example, a door may be closed to inhibit further advancement (retracing), a map or a field in a game may be reduced to narrow the range of action, or log-out is carried out so that information will not be acquired.

Then, the server 11 instructs the terminal 12 to delete the verification image (step S412). That is, because a bill image is selected, or the predetermined time elapses without making the selection, the server 11 instructs the terminal 12 to delete the verification image.

Turning again to the process of the terminal 12, the terminal 12 determines whether the delete instruction has been received (step S506).

When having determined that the deleted instruction has not been received (step S506; No), the terminal 12 returns the process to step S504. That is, while the verification image G is displayed, the player can repeat the operation to pick up the bill image F.

Upon reception of the delete instruction (step S506; Yes), on the other hand, the terminal 12 stops combination and deletes the verification image (step S507).

That is, as the verification event ends, the game image generation unit 303 returns the game image to the normal one.

When the player's manual operation is verified in the verification event, the terminal 12 reflects update of the game situation by the server 11. That is, the game situation management unit 305 properly reflects contents of the update made in step S410 by the server 11. When update of the game situation to give any advantage is not carried out in step S411, however, the game situation management unit 305 does not perform reflection.

The description of the event generation process in FIG. 10 has been described as a process that accommodates cases when the count value and the prescribed value are used in steps S404, S408 and S409 and the upper limit is set to the number of erroneous operations of the player.

However, those steps S404, 5408 and 5409 may be deleted from the event generation process, and the player may perform erroneous operations any arbitrary amount of times within a predetermined time, so that a proper operation, if performed within the predetermined time, can be properly deemed a manual operation.

That is, when a manual operation is not verified in step S407 (step S407; No), the server 11 proceeds the process to step S406 to determine whether a predetermined time has elapsed. Accordingly, the process proceeds to step S411 only when the predetermined time elapses (step S406; Yes), and no matter how many times the player makes erroneous operations, if a proper operation is performed before the predetermined time elapses, a manual operation is verified (step S407; Yes).

It should be noted that a similar process is possible even when a sufficiently large value is set as the prescribed value as mentioned above without deleting those steps.

In the event generation process and event response process, a verification event is generated according to the progress state of the game, and the terminal 12 verifies if the player is performing a manual operation.

That is, a verification image generated with a specific image (bill image) arranged at random is displayed on the terminal 12, prompting the player to perform a predetermined operation. This verification image does not contain information indicating where the specific image is arranged, and the position thereof can be seen only by visual judgment of the player (person).

In cases when a character or the like is automatically manipulated by a Bot, therefore, although transmission of a verification image from the server 11 can be grasped, it is very difficult to select a specific image (pick up a bill image) because infatuation for specifying the position of the specific image in the verification image is not acquired at all.

As a character is sequentially moved to a plurality of fixed positions or random positions and instructed to perform a pickup operation through an automatic operation, a specific image may be accidentally selected while the count value is within the prescribed value, however the probability is very low.

Yet, even such an automatic operation may be made to have hardly any effect by, for example, counting the number of sequential events in which a specific image could not be selected and inhibiting subsequent advantageous updates of the game situation when the number of such sequential events exceeds a limit value.

That is, even if there is an event in which a specific image is accidentally selected, events where a specific image cannot be selected often follow. When the number of such sequential events exceeds the limit value, the operation is deemed an automatic operation; subsequent advantageous updates of the game situation are not carried out.

In consideration of a case where for some reason, the player consecutively performs events in which a specific image could be selected and the number of such sequential events exceeds the limit value, update may be inhibited after which the number of sequential events in which a specific image has been selected may be counted, and update may be carried out again when the number of sequential events exceeds a predetermined value.

As a result, it is possible to adequately prevent an unauthorized behavior like a Bot.

(Another Embodiment)

The foregoing description of the embodiment has been given of the cases where at the time of generating a verification event, a verification image is combined into the then game image. That is, the game image itself does not change (it is the same) before and after combination of the verification image.

Therefore, as the game image before combining the verification image is stored at a good timing and a difference between the game image and the game image after combining the verification image is obtained, it is theoretically possible to extract (emerge) a specific image or the like in the verification image.

To more strictly prevent an unauthorized behavior, therefore, at the time of generating a verification event, a verification image may be combined while adequately changing the scene of a game image.

The terminal 12 which is characterized by combining a verification image while adequately changing the scene of a game image will be described below referring to FIG. 11.

Figure 11:
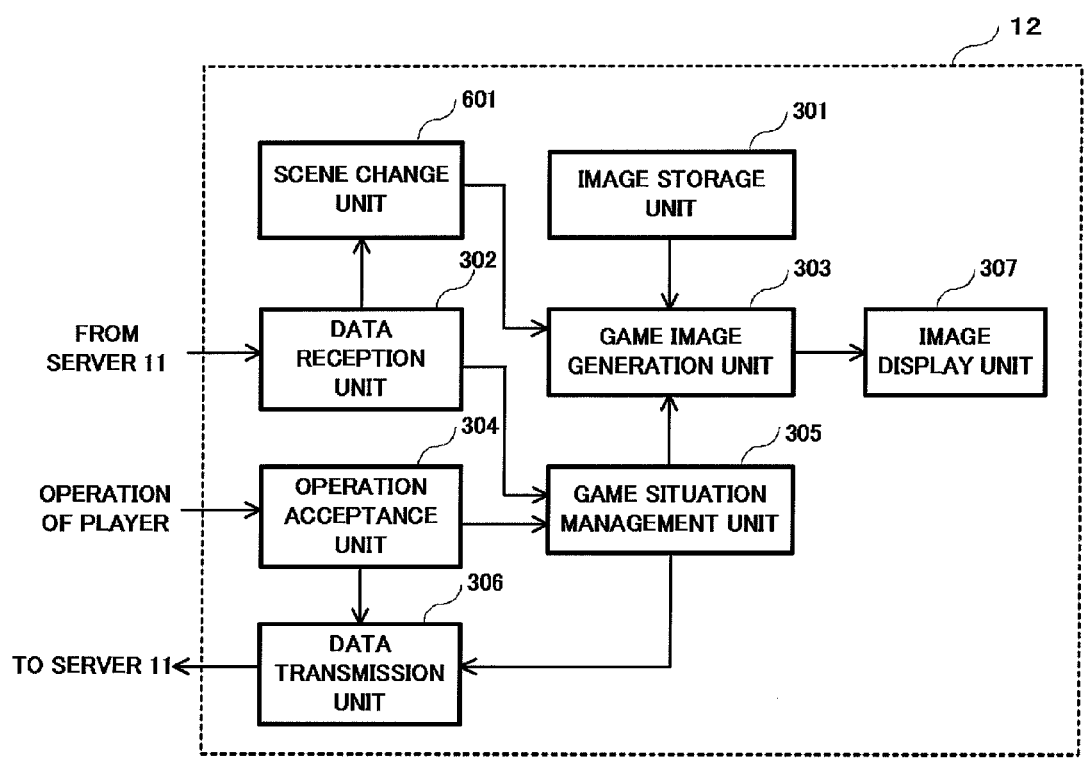
FIG. 11 is an exemplary diagram showing one example of the schematic configuration of a terminal according to another embodiment.

FIG. 11 is an exemplary diagram showing the schematic configuration of the terminal 12 according to another embodiment. The following description will be given referring to the diagram.

The terminal 12 in FIG. 11 is configured to have a scene change unit 601 added to the terminal 12 in FIG. 7. That is, the image storage unit 301 to the image display unit 307 have the same configurations as those in the terminal 12 in FIG. 7.

When a verification image is transmitted from the server 11, the scene change unit 601 controls the game image generation unit 303 to generate game images with different scenes.

For example, the scene change unit 601 selects an arbitrary scene from a plurality of special scenes prepared for a verification event, and causes the game image generation unit 303 to generate the game image with that scene.

The scene change unit 601 may select an arbitrary game field from a plurality of game fields, and may cause the game image generation unit 303 to generate a game image along the field, thereby changing the scene.

When a grassland has been a game field so far, for example, a ruin different there from is selected as a game field. Then, the game image generation unit 303 is caused to generate a game image along the game field of the selected ruin to change the scene.

Further, the scene change unit 601 may change the scene by changing the viewpoint position (camera position) to be a reference at the time of generating a game image to an arbitrary position.

Figure 12A:
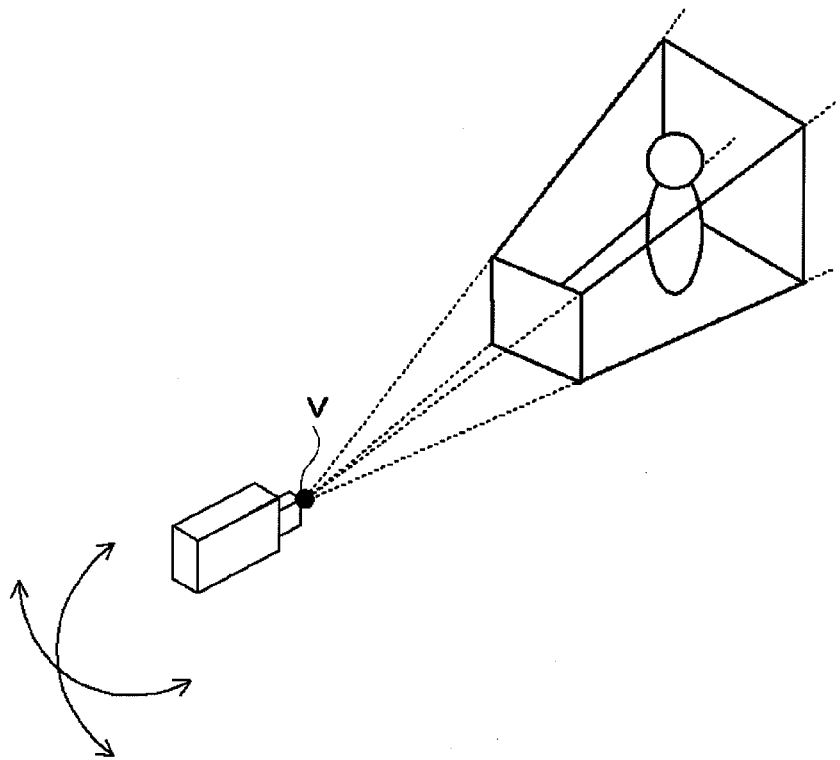
FIG. 12A is an exemplary diagram for explaining how to change a viewpoint position.

For example, with a current viewpoint position V being a reference, the scene change unit 601 selects an arbitrary position within a predetermined range and changes the viewpoint position to the selected position as shown in FIG. 12A.

Figure 12B:
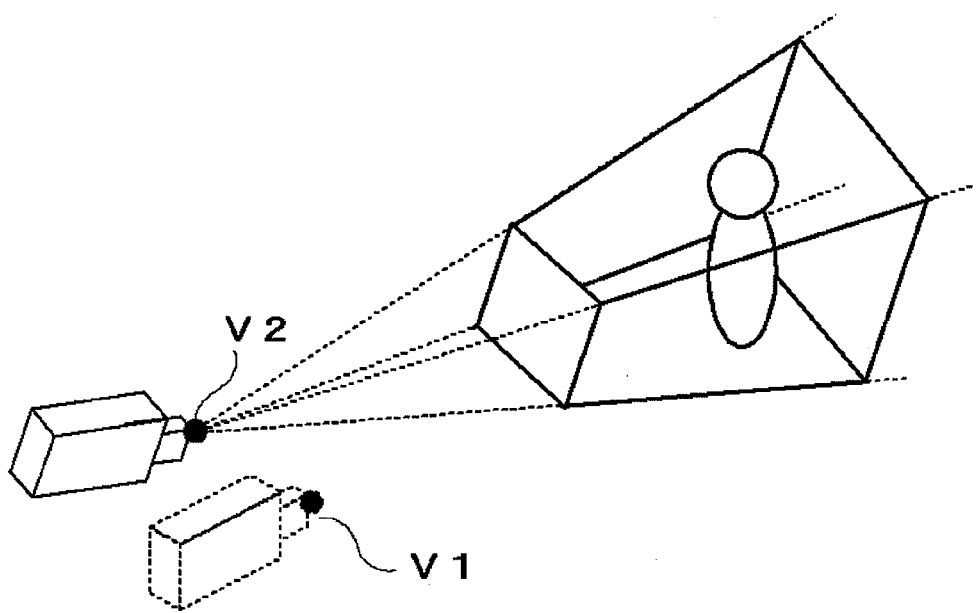
FIG. 12B is an exemplary diagram for explaining how to change the viewpoint position.

That is, the as shown in FIG. 12B, while a game image as seen from a view position V1 is generated by the game image generation unit 303, a game image is generated with the viewpoint position being changed to an arbitrarily selected view position V2.

The game image generation unit 303 combines a verification image into the game image whose scene is changed by the scene change unit 601 in this manner.

Because game images before and after combining the verification image differ from each other, even if the difference between the game image before the combination and the game image after the combination is obtained, a specific image or the like cannot be extracted (emerged). This makes it possible to prevent an unauthorized behavior more intensely.

Although the foregoing description of the embodiment has been given of the case where a verification image which has a specific image arranged at an arbitrary position is generated and combined into a game image, a verification image is not limited to one including such a specific image, and can be changed as needed.

For example, a verification image including contents indicating an arbitrary key operation which is to be performed by the player may be generated and combined into a game image. At this time, a verification image properly processed is generated in such a way that the contents of the verification image (contents of the key operation to be performed) are not read out.

Figure 13A:
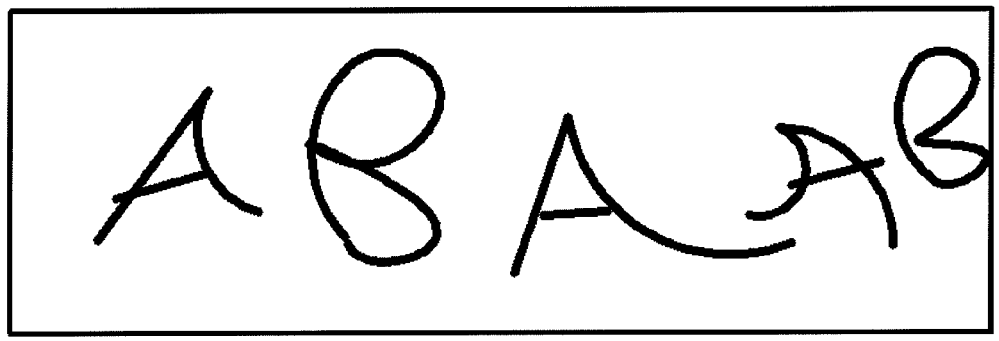
FIG. 13A is an exemplary diagram showing one example of another verification image.
Figure 13B:
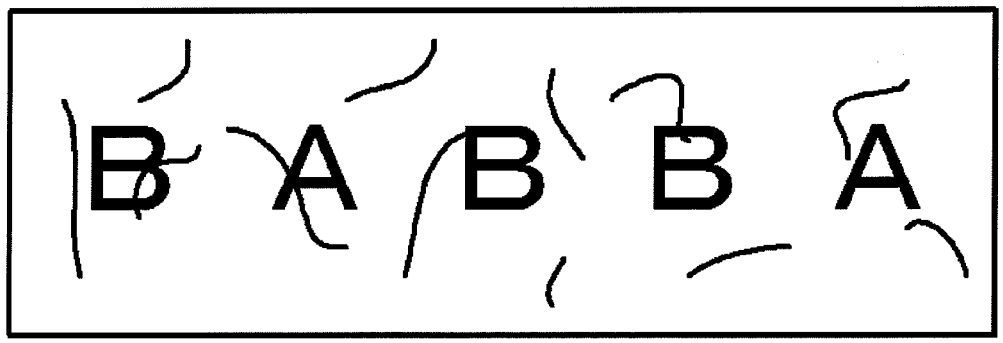
FIG. 13B is an exemplary diagram showing one example of a further verification image.

As an example, the event generation unit 203 generates a verification image in which letters (button names) are properly modified as shown in FIG. 13A is generated, or a verification image in which noise (rubbish) in addition to letters are dispersed as shown in FIG. 13B is generated.

Those verification images in FIGS. 13A and 13B are designed so that correct letters cannot be obtained by image recognition or the like, and the contents of a specified key operation (which buttons should be pressed in order) cannot be known unless by judgement based on human eyes.

Therefore, in case where such a verification image is combined into a game image and displayed by the terminal 12, the player can perform the specified key operation when the player is performing a manual operation, but when a Bot-originated automatic operation is performed, it is very difficult to perform the specified key operation information even if image recognition or the like is programmed.

As a result, it is possible to adequately prevent an unauthorized behavior, such as, for example, Bot behavior.

As described above, the present invention can adequately prevent an unauthorized behavior like a Bot.

This application claims the priority of Japanese Patent Application No. 2007-260688, which is incorporated herein in its entirety by reference.

INDUSTRIAL APPLICABILITY

As described above, it is possible to provide a network game system, a server, an unauthorized behavior prevention method, an unauthorized behavior detection method, an information recording medium, and a program, which can adequately prevent an unauthorized behavior such as a Bot.

The invention claimed is:
1. A network system having a server and a user device connected together in a communicable manner to allow a user to manipulate a character in a virtual space on the user device, the server including:
   a verification image transmission unit that transmits a verification image for verifying a character manipulation by the user to the user device based on a progress state on the user device; and
   an update unit that updates a situation on the user device based on operation information indicating a content of the character manipulation in the user device to which the verification image has been transmitted, the user device including:
   a management unit that manages a situation including the progress state;
   an image display unit that displays the verification image when the verification image is transmitted from the server;
   an operation information transmission unit that transmits the operation information indicating a content of a character manipulation in a state where the verification image is displayed, the server further including:
   a properness/improperness judgment unit that judges properness/improperness of a character movement with respect to the verification image based on the operation information transmitted from the device, wherein the update unit of the server updates the situation in such a way as to be advantageous for the character when the properness/improperness judgment unit has judged that the character movement is proper; and, a verification image generation unit that generates a verification image in which a specific image is located at an arbitrary position when a predetermined condition is fulfilled, the verification image transmission unit of the server transmits, to the user device, a verification image which is generated by the verification image generation unit every time a location of the specific image is improper, and the properness/improperness judgment unit of the server judges properness/improperness of a character movement with respect to the specific image located in the verification image to judge whether the specific image is viewed by the user.

2. The network system according to claim 1, wherein the image display unit of the user device displays an image, and changes a scene of the image and displays the verification image when the verification image is transmitted from the server.

3. A server connected in a communicable manner to a user device with which a user manipulates a character in a virtual space, comprising:

a verification image transmission unit that transmits a verification image for verifying a character manipulation by the user to the user device based on a progress state on the user device;

an update unit that updates a situation on the user device based on operation information indicating a content of the character manipulation in the user device to which the verification image has been transmitted;

a properness/improperness judgment unit that judges properness/improperness of a character movement with respect to the verification image based on the operation information transmitted from the user device, wherein the update unit updates the situation in such a way as to be advantageous for the character when the properness/improperness judgment unit has judged that the character movement is proper; and, a verification image generation unit that generates a verification image in which a specific image is located at an arbitrary position when a predetermined condition is fulfilled, wherein the verification image transmission unit transmits, to the user device, a verification image which is generated by the verification image generation unit every time a location of the specific image is improper, and the properness/improperness judgment unit judges properness/improperness of a character movement with respect to the specific image located in the verification image to judge whether the specific image is viewed by the user.

4. An unauthorized behavior detection method for a server connected in a communicable manner to a user device with which a user manipulates a character in a virtual space, the method comprising:

a verification image transmission step of transmitting a verification image for verifying a character manipulation by the user to the user device based on a progress state;

an update step of updating a situation on the user device based on operation information indicating a content of the character manipulation in the user device to which the verification image has been transmitted;

a properness/improperness judgment step of judging properness/improperness of a character movement with respect to the verification image based on the operation information transmitted from the user device, wherein the update step updates the situation in such a way as to be advantageous for the character when the properness/improperness judgment unit has judged that the character movement is proper; and, a verification image generation step of generating a verification image in which a specific image is located at an arbitrary position when a predetermined condition is fulfilled, wherein the verification image transmission step transmits, to the user device, a verification image which is generated by the verification image generation unit every time a location of the specific image is improper, and the properness/improperness judgment step judges properness/improperness of a character movement with respect to the specific image located in the verification image to judge whether the specific image is viewed by the user.

5. A non-transitory computer-readable information recording medium recording a program for a server connected in a communicable manner to a user device with which a user manipulates a character in a virtual space, the program allows the server and/or user device to function as:

a verification image transmission unit that transmits a verification image for verifying a character manipulation by the user to the user device based on a progress state;

an update unit that updates a situation on the user device based on operation information indicating a content of the character manipulation in the user device to which the verification image has been transmitted;

a properness/improperness judgment unit that judges properness/improperness of a character movement with respect to the verification image based on the operation information transmitted from the user device, wherein the update unit updates the situation in such a way as to be advantageous for the character when the properness/improperness judgment unit has judged that the character movement is proper; and, a verification image generation unit that generates a verification image in which a specific image is located at an arbitrary position when a predetermined condition is fulfilled, wherein the verification image transmission unit transmits, to the user device, a verification image which is generated by the verification image generation unit every time a location of the specific image is improper, and the properness/improperness judgment unit judges properness/improperness of a character movement with respect to the specific image located in the verification image to judge whether the specific image is viewed by the user.

6. A program stored on a non-transitory computer-readable information recording mediation for a server connected in a communicable manner to a user device with which a user manipulates a character in a virtual space, the program allows the server and/or user device to function as:

verification image transmission unit that transmits a verification image for verifying a character manipulation by the user to the user device based on a progress state on the user device;

an update unit that updates a situation on the user device based on operation information indicating a content of the character manipulation in the user device to which the verification image has been transmitted;

a properness/improperness judgment unit that judges properness/improperness of a character movement with respect to the verification image based on the operation information transmitted from the user device, wherein the update unit updates the situation in such a way as to be advantageous for the character when the properness/improperness judgment unit has judged that the character movement is proper; and, a verification image generation unit that generates a verification image in which a specific image is located at an arbitrary position when a predetermined condition is fulfilled, wherein the verification image transmission unit transmits, to the user device, a verification image which is generated by the verification image generation unit every time a location of the specific image is improper, and the properness/improperness judgment unit judges properness/improperness of a character movement with respect to the specific image located in the verification image to judge whether the specific image is viewed by the user.

7. A network system having a server and a user device connected together in a communicable manner to allow a user to manipulate a character in a virtual space on the user device, the server including:

a verification image transmission unit that transmits a verification image for verifying a character manipulation by the user to the user device based on a progress state on the user device; and an update unit that updates a situation on the user device based on operation information indicating a content of the character manipulation in the user device to which the verification image has been transmitted, the user device including:

a management unit that manages a situation including the progress state;

an image display unit that displays the verification image when the verification image is transmitted from the server;

an operation information transmission unit that transmits the operation information indicating a content of a character manipulation in a state where the verification image is displayed, the server further including:

a properness/improperness judgment unit that judges properness/improperness of a character movement with respect to the verification image based on the operation information transmitted from the device, wherein the update unit of the server updates the situation in such a way as to be disadvantageous for the character when the properness/improperness judgment unit has judged that the character movement is improper; and, a verification image generation unit that generates a verification image in which a specific image is located at an arbitrary position when a predetermined condition is fulfilled, the verification image transmission unit of the server transmits, to the user device, a verification image which is generated by the verification image generation unit every time a location of the specific image is improper, and the properness/improperness judgment unit of the server judges properness/improperness of a character movement with respect to the specific image located in the verification image to judge whether the specific image is viewed by the user.

* * * * *